(12) United States Patent
Akiyama et al.

(10) Patent No.: US 12,222,547 B2
(45) Date of Patent: Feb. 11, 2025

(54) COATING REMOVAL DEVICE

(71) Applicants: FURUKAWA ELECTRIC CO., LTD, Tokyo (JP); Furukawa FITEL (Thailand) Co., Ltd., Phranakorn Sri Ayutthaya (TH)

(72) Inventors: Tomohiro Akiyama, Tokyo (JP); Boonsin Thanatummatis, Phranakorn Sri Ayutthaya (TH); Sarawut Polsen, Phranakorn Sri Ayutthaya (TH); Jakkapat Wattanarat, Phranakorn Sri Ayutthaya (TH); Nuttawut Budsayaplakorn, Phranakorn Sri Ayutthaya (TH)

(73) Assignees: FURUKAWA ELECTRIC CO., LTD, Tokyo (JP); Furukawa FITEL (Thailand) Co., Ltd., Phrankorn Sri Ayutthaya (TH)

( * ) Notice: Subject to any disclaimer, the term of this patent is extended or adjusted under 35 U.S.C. 154(b) by 840 days.

(21) Appl. No.: 17/443,844

(22) Filed: Jul. 28, 2021

(65) Prior Publication Data

US 2022/0043212 A1    Feb. 10, 2022

(30) Foreign Application Priority Data

Aug. 7, 2020   (JP) .................... 2020-134673

(51) Int. Cl.
*G02B 6/245* (2006.01)
*B26D 7/08* (2006.01)
(Continued)

(52) U.S. Cl.
CPC ............ *G02B 6/245* (2013.01); *B26D 7/086* (2013.01); *B26D 7/10* (2013.01); *H02G 1/1256* (2013.01); *H02G 1/1278* (2013.01)

(58) Field of Classification Search
USPC .................................. 362/119, 120
See application file for complete search history.

(56) References Cited

U.S. PATENT DOCUMENTS

| | | | |
|---|---|---|---|
| 5,590,475 A * | 1/1997 | Andis | A45D 20/12 34/90 |
| 7,077,040 B1 * | 7/2006 | Carbonaro | B26D 5/00 83/13 |

(Continued)

FOREIGN PATENT DOCUMENTS

| | | |
|---|---|---|
| EP | 3 477 349 A1 | 5/2019 |
| JP | 9-277681 A | 10/1987 |

(Continued)

OTHER PUBLICATIONS

Japanese Office Action issued Aug. 2, 2022 in Japanese Patent Application No. 2020-134673 (with unedited computer generated English translation), citing documents 15 through 22 therein, 10 pages.

*Primary Examiner* — Hwei-Siu C Payer
(74) *Attorney, Agent, or Firm* — Oblon, McClelland, Maier & Neustadt, L.L.P.

(57) ABSTRACT

A coating removal device removing a coating of an optical fiber along an axial direction of the optical fiber includes a heating portion including a cutting blade making a cut in the coating of the optical fiber, and a heater heating a part of the coating that is closer to a tip thereof than the cutting blade; a main body portion including a control board electrically connected with the heater; a holding portion holding the optical fiber, the holding portion being provided on the opposite side to the heater with the cutting blade being located between the holding portion and the heater; and a slide mechanism allowing the holding portion to slidably move with respect to the heating portion such that the holding portion is distanced away from the heating portion (Continued)

in the axial direction. The main body portion, the heating portion and the holding portion are located in this order in the axial direction, and the heating portion includes a vibration notification portion giving information to an operator by vibrating.

11 Claims, 20 Drawing Sheets

(51) Int. Cl.
  *B26D 7/10* (2006.01)
  *H02G 1/12* (2006.01)

(56) References Cited

U.S. PATENT DOCUMENTS

| | | | | |
|---|---|---|---|---|
| 10,456,190 | B2* | 10/2019 | Vayser | ............... A61B 90/30 |
| 2002/0148122 | A1* | 10/2002 | Sanchez | ............... B67B 7/385 |
| | | | | 30/421 |
| 2012/0279359 | A1* | 11/2012 | Homma | ............... H02G 1/1241 |
| | | | | 81/9.41 |
| 2018/0272550 | A1* | 9/2018 | Sakanishi | ............... B26D 1/035 |
| 2021/0364699 | A1* | 11/2021 | Chang | ............... H02G 1/1204 |
| 2022/0043212 | A1* | 2/2022 | Akiyama | ............... H02G 1/1278 |
| 2023/0121477 | A1* | 4/2023 | Tschudy | ............... G04G 13/026 |
| | | | | 368/73 |

FOREIGN PATENT DOCUMENTS

| | | | | |
|---|---|---|---|---|
| JP | 9-113733 | A | 5/1997 | |
| JP | 11-23851 | A | 1/1999 | |
| JP | 3216774 | U | 6/2018 | |
| JP | 2018-132757 | A | 8/2018 | |
| JP | 2018-138970 | A | 9/2018 | |
| JP | 2019-511349 | A | 4/2019 | |
| JP | 212781335 | U | 3/2021 | |
| WO | WO-2017024979 | A1* | 2/2017 | ............. G02B 6/245 |
| WO | WO 2020/105943 | A1 | 5/2020 | |

* cited by examiner

COATING REMOVAL DEVICE

BACKGROUND OF THE INVENTION

1. Field of the Invention

The present invention relates to a coating removal device that removes a coating of, for example, an optical fiber by decreasing the adhesiveness of the coating.

2. Description of the Prior Art

An optical fiber includes a bare fiber including a core and a clad, and a synthetic resin coating that coats an outer circumferential surface of the bare fiber. The optical fiber has the coating removed at a tip thereof, and is connected with another optical fiber. As a device that removes such a coating of the optical fiber, a coating removal device described in, for example, Japanese Laid-Open Patent Publication No. 2018-138970 is known.

The device described in Japanese Laid-Open Patent Publication No. 2018-138970 will be described in detail. The coating removal device makes a cut in a coating to be removed with a cutting blade, and also heats the coating by a heater to decrease the adhesiveness of the coating, so that the coating is removed easily.

The coating removal device described in Japanese Laid-Open Patent Publication No. 2018-138970 includes an LED lamp as an element that gives information to an operator. When the heating of the coating is completed, this coating removal device, for example, turns on the LED lamp to notify the operator that the heating of the coating is completed. In this manner, this coating removal device easily notifies the operator that the heating of the coating is completed.

The coating removal device described in Japanese Laid-Open Patent Publication No. 2018-138970 is of a handy type and is grabbed by the operator for use. Therefore, in the case where the operator assumes a certain posture, or in the case where the device and the operator are at a site of a certain brightness or are illuminated in a certain manner, the operator may undesirably not notice that the LED lamp is turned on.

For this reason, it is conceivable to notify the operator with a buzzer in addition to the LED lamp. However, in the case where the operator is at a noisy site, the operator may undesirably not notice the buzzer. Therefore, there is room for improvement regarding the manner of notifying the operator.

PRIOR ART DOCUMENT

Patent Document

Patent Document 1: Japanese Laid-Open Patent Publication No. 2018-138970

SUMMARY OF THE INVENTION

Problems to be Solved by the Invention

In light of such a problem, the present invention has an object of providing a coating removal device easily giving information to an operator.

Means for Solving the Invention

The present invention is directed to a coating removal device removing a coating of an optical fiber along an axial direction of the optical fiber. The coating removal device includes a heating portion including a cutting blade making a cut in the coating of the optical fiber, and a heater heating a part of the coating that is closer to a tip thereof than the cutting blade; a main body portion including a control board electrically connected with the heater; a holding portion holding the optical fiber, the holding portion being provided on the opposite side to the heater with the cutting blade being located between the holding portion and the heater; and a slide mechanism allowing the holding portion to slidably move with respect to the heating portion such that the holding portion is distanced away from the heating portion in the axial direction. The main body portion, the heating portion and the holding portion are located in this order in the axial direction. The heating portion includes a vibration notification portion giving information to an operator by vibrating.

The expression "giving information to an operator" refers to, for example, notifying the operator that the heating of the coating is completed, notifying the operator of an abnormality of the heater, notifying the operator of an abnormality of the heating portion, or notifying the operator of an abnormality of the main body portion.

The "vibration notification portion" refers to, for example, a disc-shaped vibration motor.

According to the present invention, the coating removal device may easily give information to the operator.

This will be described specifically. When grabbing the coating removal device, the operator often grabs the heating portion, instead of the main body portion, with one of his/her hands. Since the vibration notification portion is provided in the heating portion, the coating removal device may transmit the vibration of the vibration notification portion to the operator more certainly than in the case where the vibration notification portion is provided in the main body portion. Therefore, the operator may tactually sense the information given to him/her even when not looking at the coating removal device.

In addition, since the operator does not need to keep looking at the coating removal device, the coating removal device may decrease the load on the operator and also easily allows the operator to look at an optical fiber to be processed next while heating the coating. Therefore, the coating removal device may improve the work efficiency as well as giving the information to the operator.

In addition, the vibration notification portion may be located away from the control board in the axial direction. Therefore, the coating removal device may suppress the transmission of the vibration of the vibration notification portion to the control board with no need to provide a damping member. For this reason, the coating removal device may prevent inconvenience from being occurred unintentionally to the control board by the vibration of the vibration notification portion.

In an embodiment of the present invention, the vibration notification portion may be located close to the cutting blade of the heating portion.

According to this structure, the coating removal device may transmit the vibration of the vibration notification portion to the operator more certainly.

This will be described specifically. The operator often grabs the heating portion at a position close to the cutting blade in order to allow a tensile force for the sliding movement to act on the holding portion and in order to remove the coating with certainty. Since the vibration notification portion is located close to the cutting blade, the coating removal device may transmit the vibration of the vibration notification portion to the operator more certainly than in the case where the vibration notification portion is located far from the cutting blade.

In an embodiment of the present invention, the heating portion may include a metal base plate secured to a housing of the heating portion, and the vibration notification portion may be secured to the base plate.

According to this structure, the coating removal device may amplify the vibration of the vibration notification portion by the metal base plate and transmit such an amplified vibration to the housing of the heating portion.

Therefore, the coating removal device may transmit the vibration of the vibration notification portion to the operator with certainty even if the vibration notification portion is small. For this reason, the operator may learn of information given to him/her even when merely touching the housing.

In addition, the coating removal device may suppress an increase in the size thereof even though including the vibration notification portion.

In an embodiment of the present invention, the slide mechanism may include a slide shaft having an end secured to the holding portion, and the base plate may slidably support the slide shaft.

According to this structure, the coating removal device may support the slide shaft with certainty, and thus may further stabilize the sliding movement of the holding portion.

The coating removal device may transmit the vibration of the vibration notification portion also to the holding portion via the slide shaft. Therefore, the coating removal device may transmit the vibration of the vibration notification portion to both of the hand of the operator grabbing the heating portion and the hand of the operator grabbing the holding portion. With such an arrangement, the coating removal device may give information to the operator more certainly.

In an embodiment of the present invention, the coating removal device may further include an assisting mechanism providing the holding portion with an urging force acting in the axial direction to assist the sliding movement of the holding portion, in a state where the holding portion is holding the optical fiber. The assisting mechanism may include a restriction member using an urging force acting in a predetermined direction to restrict provision of the urging force to the holding portion, in a state where the holding portion is not holding the optical fiber. The vibration notification portion may vibrate in a direction generally perpendicular to the predetermined direction.

According to this structure, the coating removal device may allow the holding portion to slidably move easily by the assisting mechanism.

In addition, the direction of the urging force acting on the restriction member and the vibration direction of the vibration notification portion are generally perpendicular to each other. Therefore, the coating removal device may prevent the urging force acting on the restriction member from being varied by the vibration of the vibration notification portion.

With such an arrangement, the coating removal device may prevent a state where the provision of the urging force to the holding portion is restricted by the restriction member from being cancelled by the vibration of the vibration notification portion. Therefore, the coating removal device may prevent the holding portion from slidably moving unintentionally.

In an embodiment of the present invention, the main body portion may include a control portion controlling an operation of each of the heater and the vibration notification portion, and the control portion may vibrate the vibration notification portion when the heating of the coating is completed.

According to this structure, the coating removal device may notify the operator that the heating of the coating is completed even when the operator is not looking at the coating removal device or even when the operator is at a noisy site.

In an embodiment of the present invention, the heating portion may include a screw hole usable to secure the coating removal device at a predetermined installment position in a work line.

The "predetermined installment position" refers to an installment position at which the coating removal device is to be installed so as to be a part of the work line, or a predetermined carrying table.

According to this structure, the coating removal device may be secured for use at a predetermined installment position, in the work line, at which the coating of the optical fiber is to be removed and a connector or the like is to be attached to the optical fiber.

In addition, for example, a screw hole may be provided to run through the housing of the heating portion and an inner wall of a base plate exposed to the screw hole may have a thread formed therein. In this case, the coating removal device may transmit the vibration of the vibration notification portion amplified by the base plate to the predetermined installment position. For this reason, the coating removal device may give information to the operator more certainly.

In an embodiment of the present invention, the coating removal device may further include a buzzer portion giving information to the operator by outputting a sound.

According to this structure, the coating removal device may give information to the operator by the vibration of the vibration notification portion and the sound that is output by the buzzer portion. Namely, the operator may learn of the information given to him/her tactically and acoustically. Therefore, the coating removal device may give information to the operator more certainly.

Since the coating removal device includes the control portion that determines, for example, whether to vibrate the vibration notification portion or to cause the buzzer portion to output a sound. Therefore, the coating removal device may vibrate the vibration notification portion or cause the buzzer portion to output a sound in accordance with the information to be given to the operator. Therefore, the coating removal device may allow the operator to distinguish the information more easily.

In an embodiment of the present invention, the cutting blade may include two blades making a cut while holding the coating therebetween, and the heating portion may include a gap adjustment portion changing the size of a gap between the two blades by pivoting.

According to this structure, the coating removal device may easily change the size of the predetermined gap between the two blades without detaching or attaching the cutting blade. Therefore, the coating removal device may, for example, easily remove the coating of the optical fiber having a different thickness from that of a previous optical fiber, at a site where the optical fiber is connected with a connector or the like.

In an embodiment of the present invention, the coating removal device may further include an illumination portion illuminating the holding portion and the heating portion.

According to this structure, the coating removal device may improve the ease of operation of removing the coating. In addition, the illumination portion may act as a notifier that gives information to the operator by being turned on or blinked. Therefore, the coating removal device may give the information to the operator more certainly.

Advantageous Effect of the Invention

The present invention provides a coating removal device easily giving information to an operator.

DESCRIPTION OF THE PREFERRED EMBODIMENTS

Hereinafter, an embodiment of the present invention will be described with reference to the drawings.

A coating removal device 10 in this embodiment heats a coating 3 of an optical fiber 1 and removes the coating 3 along an axial direction of the optical fiber 1. With reference to FIG. 1 through FIGS. 11A and 11B, the coating removal device 10 will be described.

Figure 1:
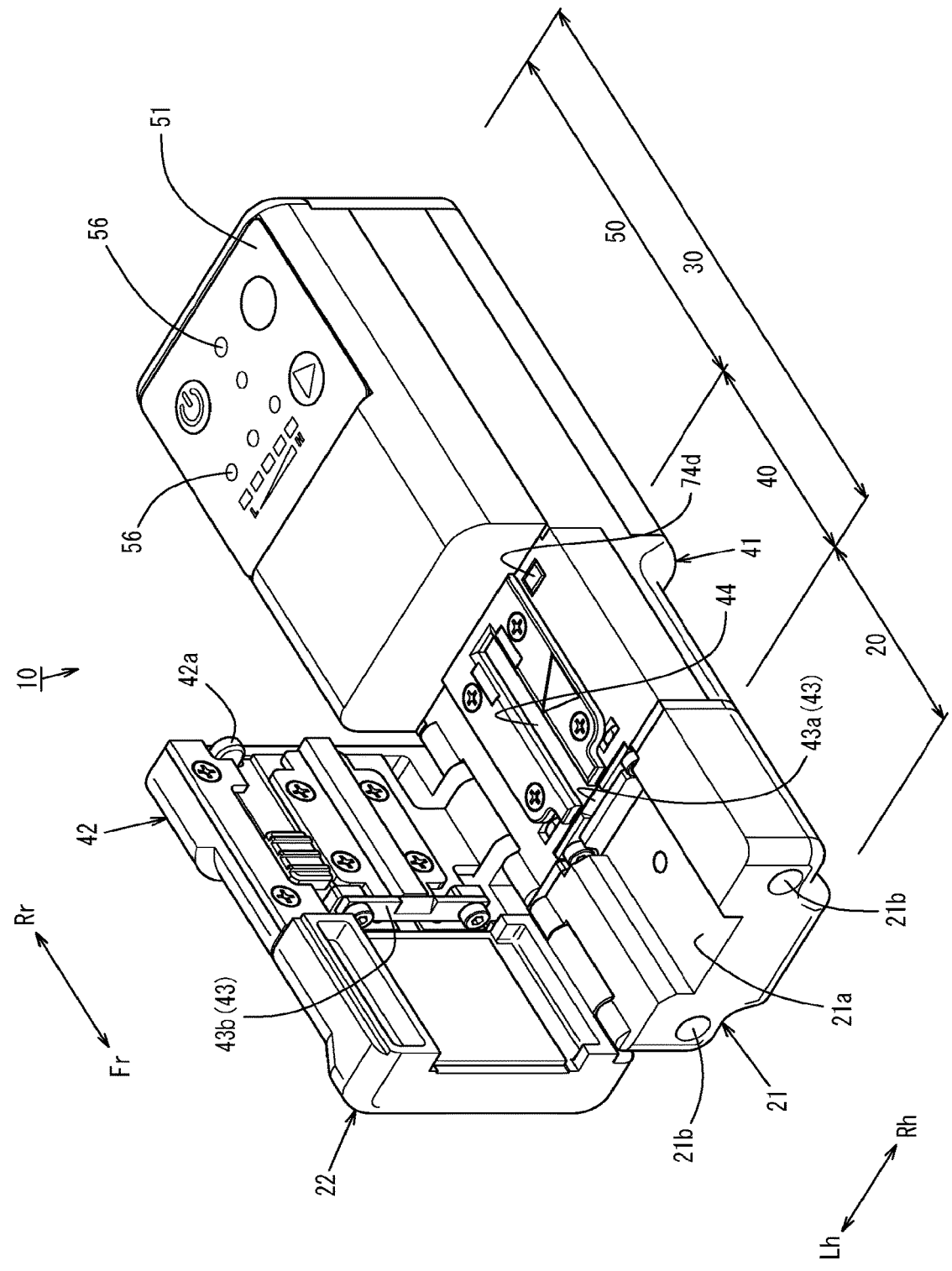
FIG. 1 is an external perspective view of a coating removal device as seen from a position to the front of, and above, the coating removal device.
Figure 2:
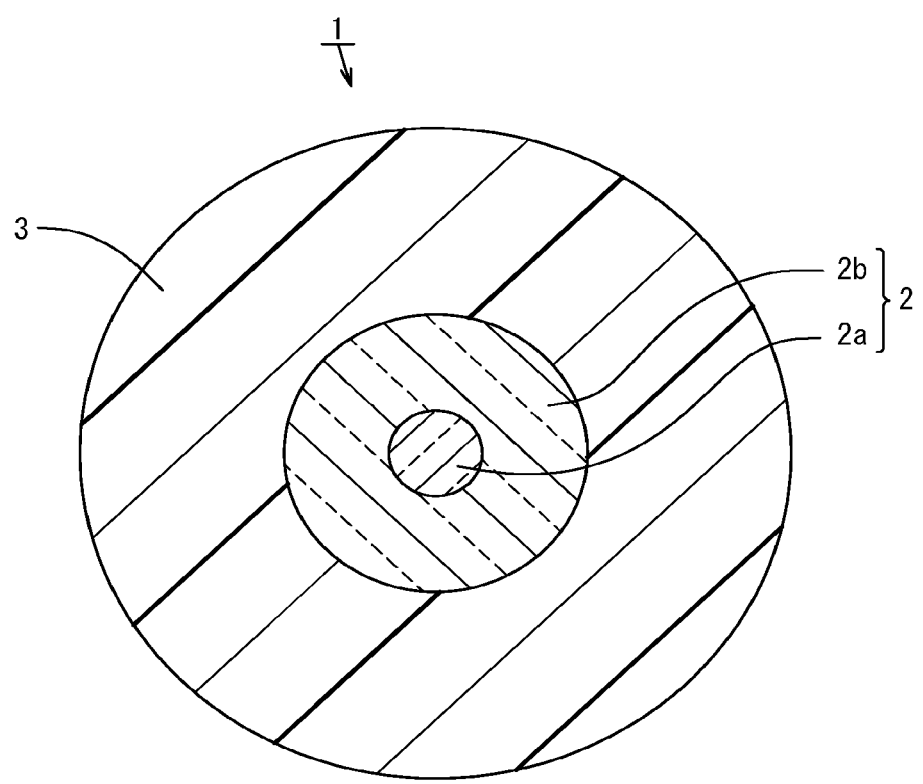
FIG. 2 is a cross-sectional view showing a structure of an optical fiber.
Figure 3:
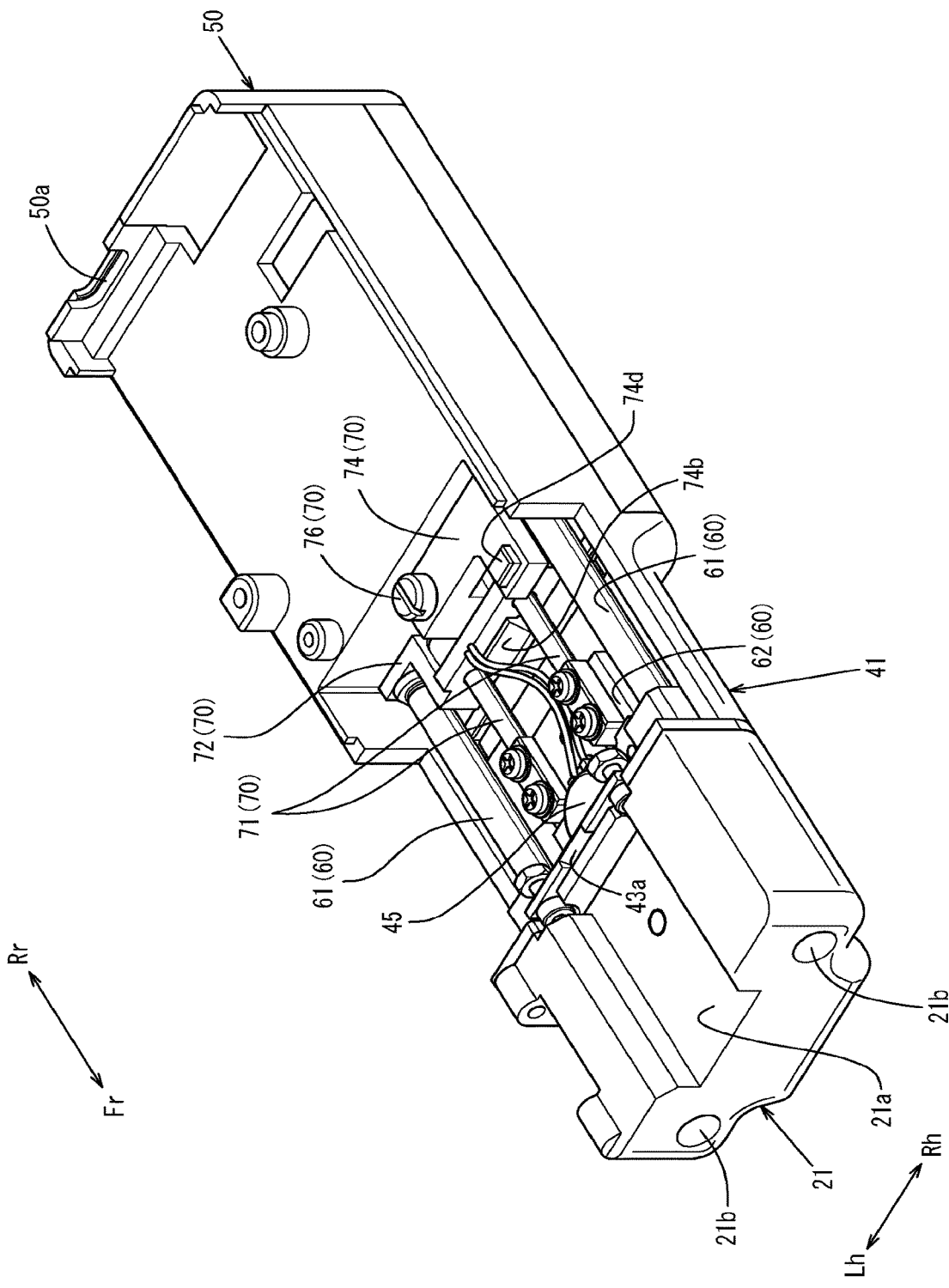
FIG. 3 is a perspective view showing an external appearance of the inside of the coating removal device.
Figure 4:
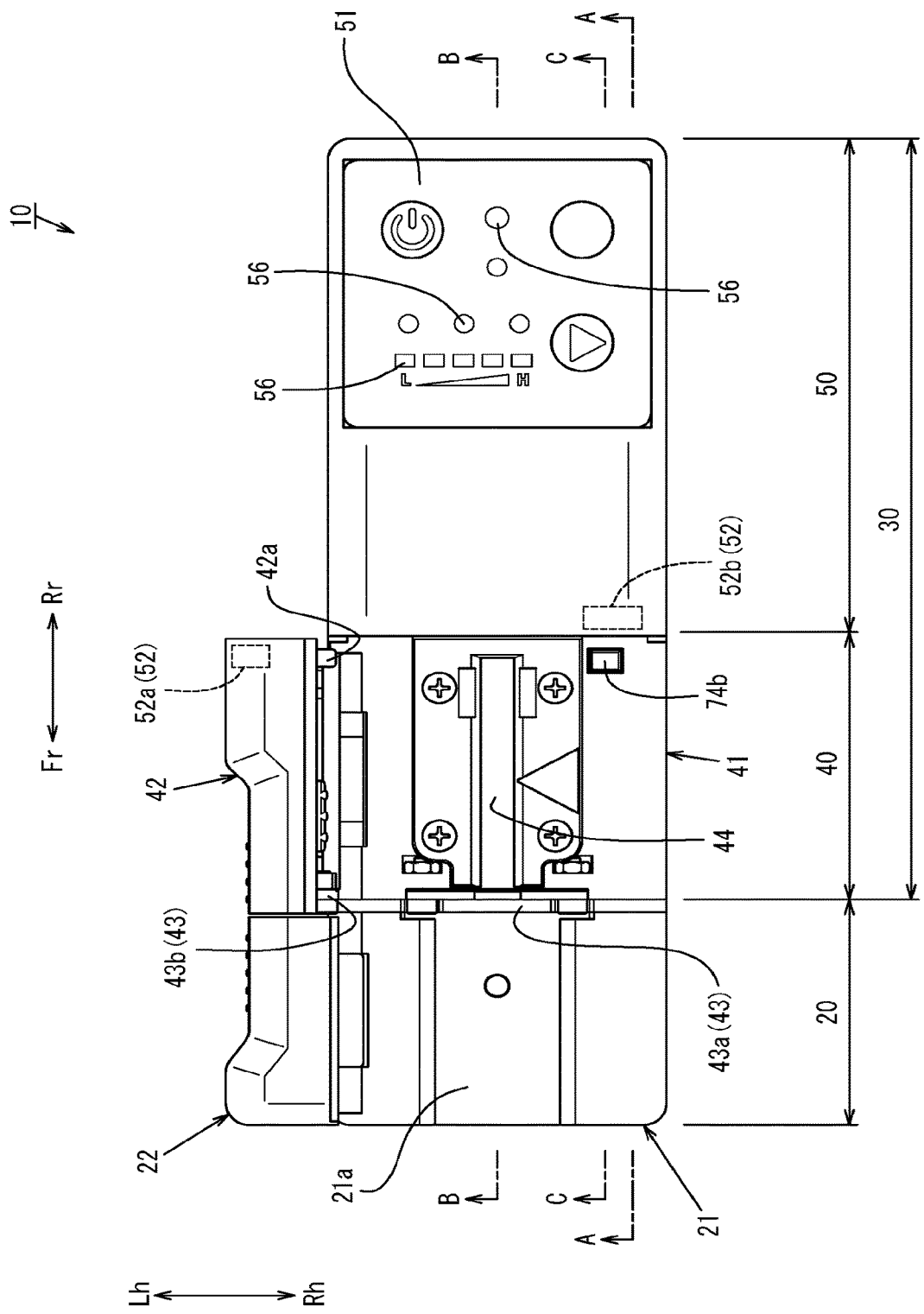
FIG. 4 is an external plan view of the coating removal device.

FIG. 1 is an external perspective view of the coating removal device 10 as seen from a position to the front of, and above, the coating removal device 10. FIG. 2 is a cross-sectional view of the optical fiber 1. FIG. 3 is a perspective view showing an external appearance of the inside of the coating removal device 10. FIG. 4 is a plan view of the coating removal device 10.

Figure 5:
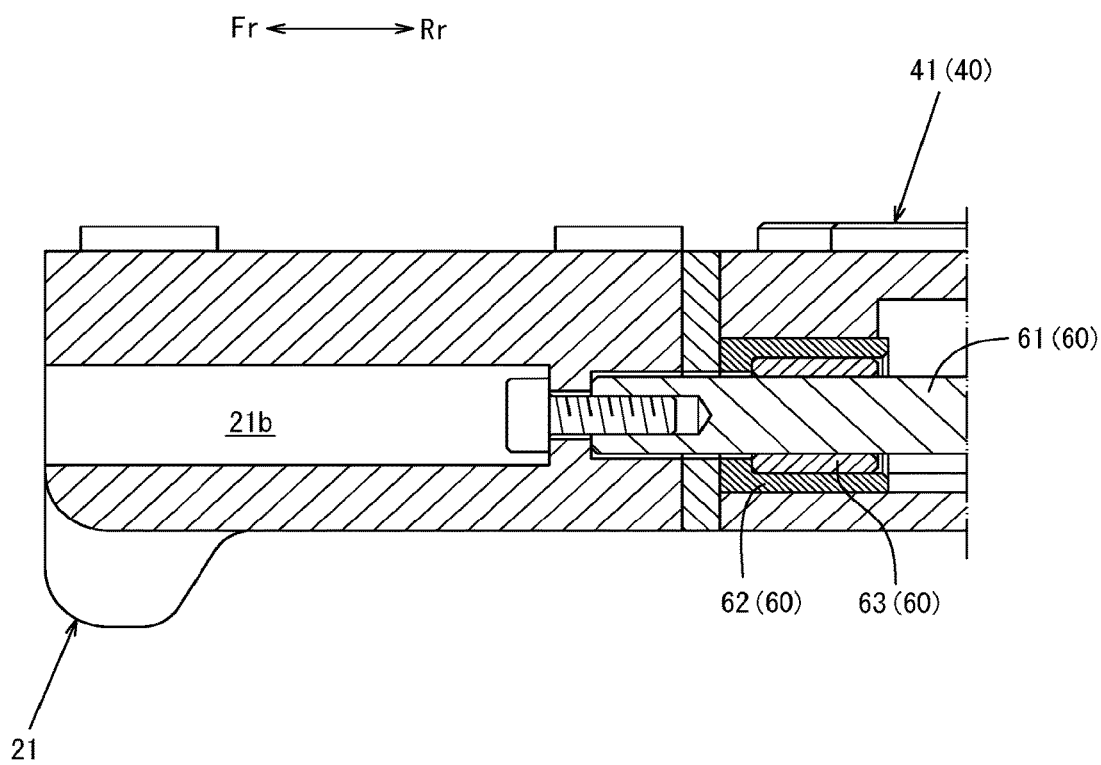
FIG. 5 is a cross-sectional view of a holding table taken along line A-A in FIG. 4.
Figure 6:
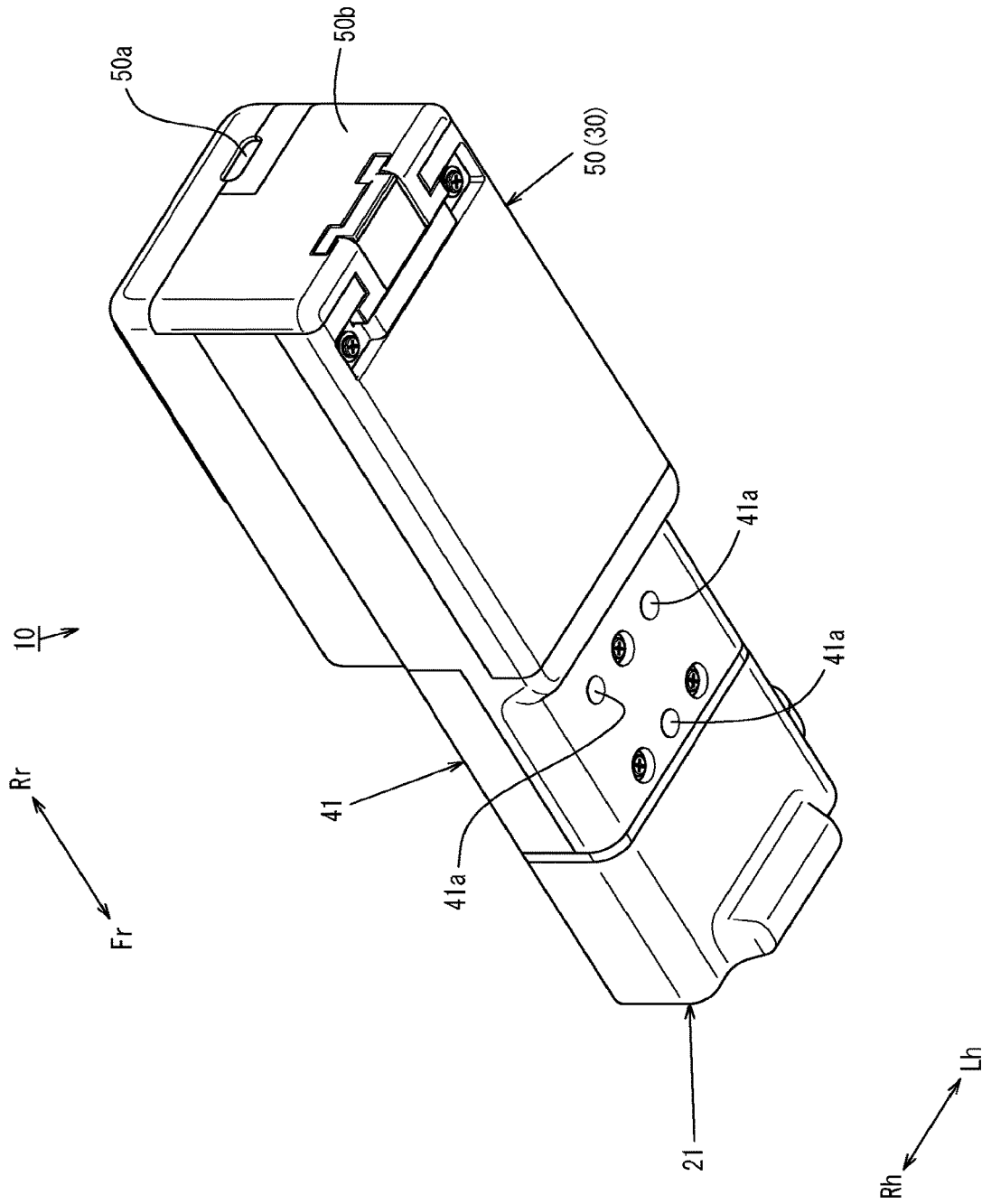
FIG. 6 is an external perspective view of the coating removal device as seen from a position to the rear of, and below, the coating removal device.
Figure 7:
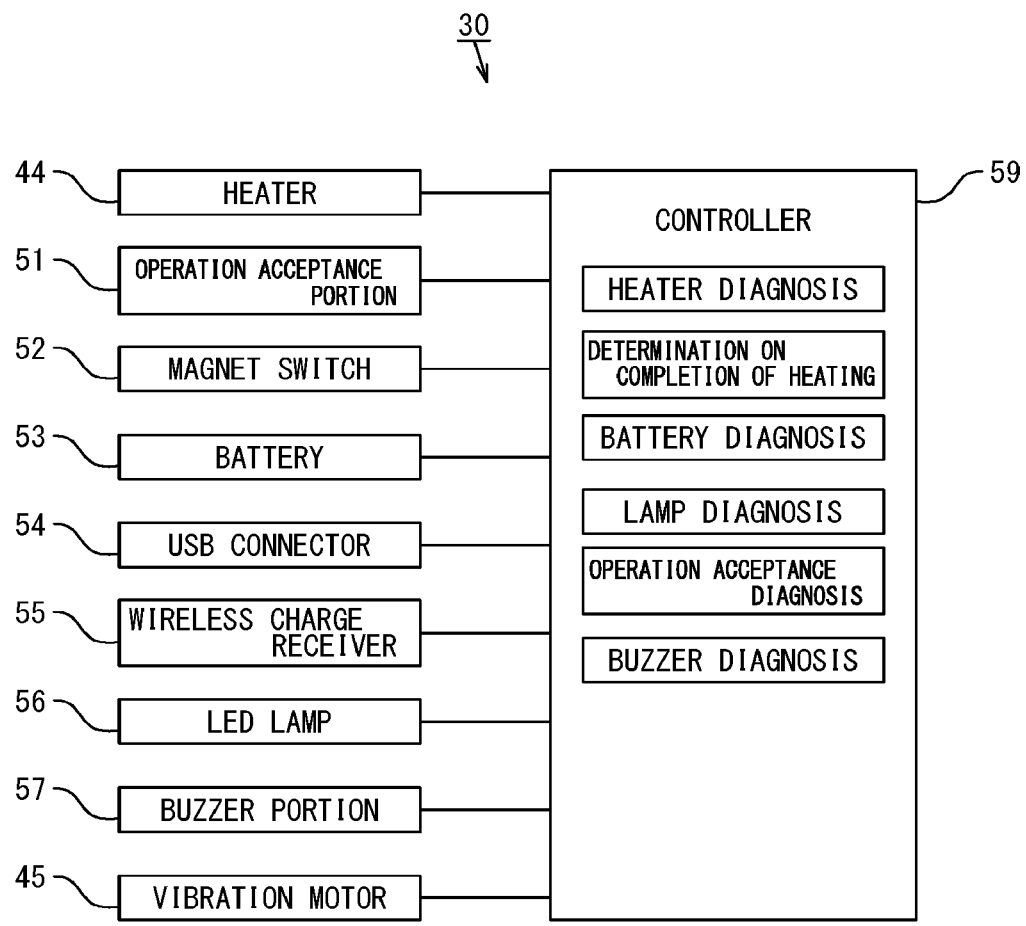
FIG. 7 is a block diagram showing an inner structure of the coating removal device.

FIG. 5 is a cross-sectional view of a holding table 21 taken along line A-A in FIG. 4. FIG. 6 is an external perspective view of the coating removal device 10 as seen from a position to the rear of, and below, the coating removal device 10. FIG. 7 is a block diagram of the coating removal device 10.

Figure 8A:
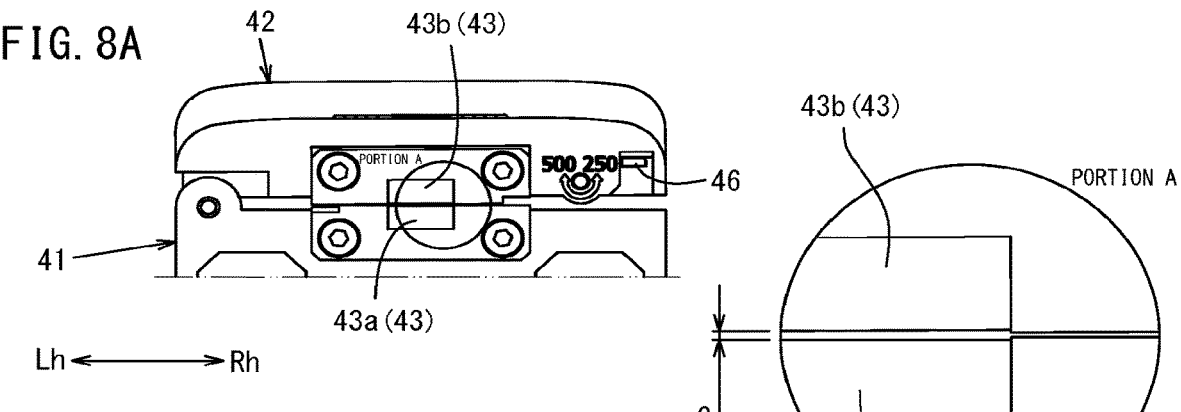
FIGS. 8A-8C provide views showing a structure of a cutting blade.
Figure 8B:
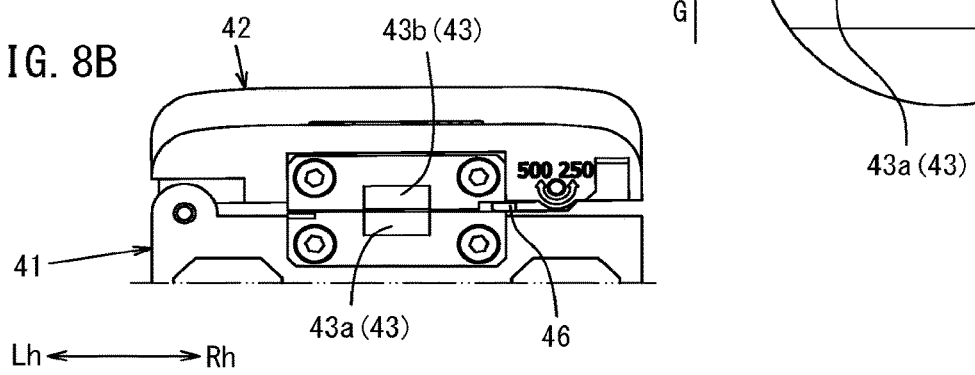
Figure 8C:
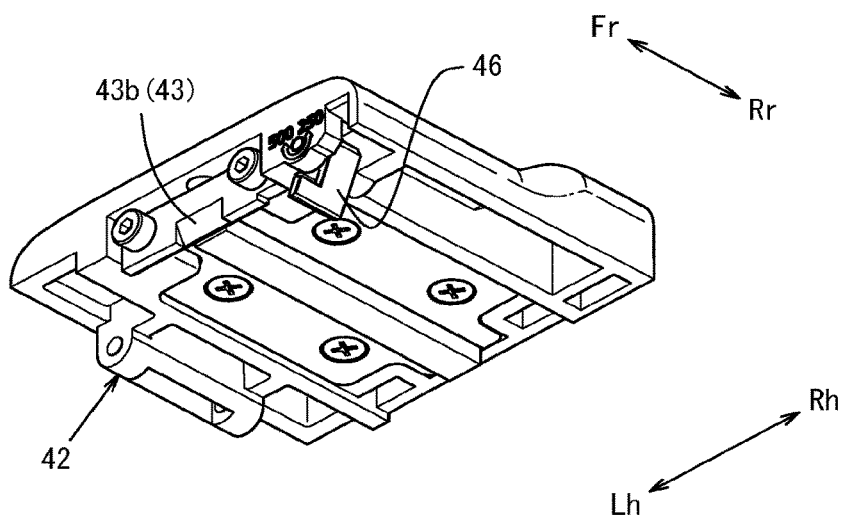

FIGS. 8A-8C provide views showing a structure of a cutting blade 43. FIG. 8A is a front view of the cutting blade 43 in a state where a gap adjustment piece 46 is pivoted rightward. FIG. 8B is a front view of the cutting blade 43 in a state where the gap adjustment piece 46 is pivoted leftward. FIG. 8C is a perspective view of a heating lid 42 as seen from a position to the front of, and below, the heating lid 42.

Figure 9:
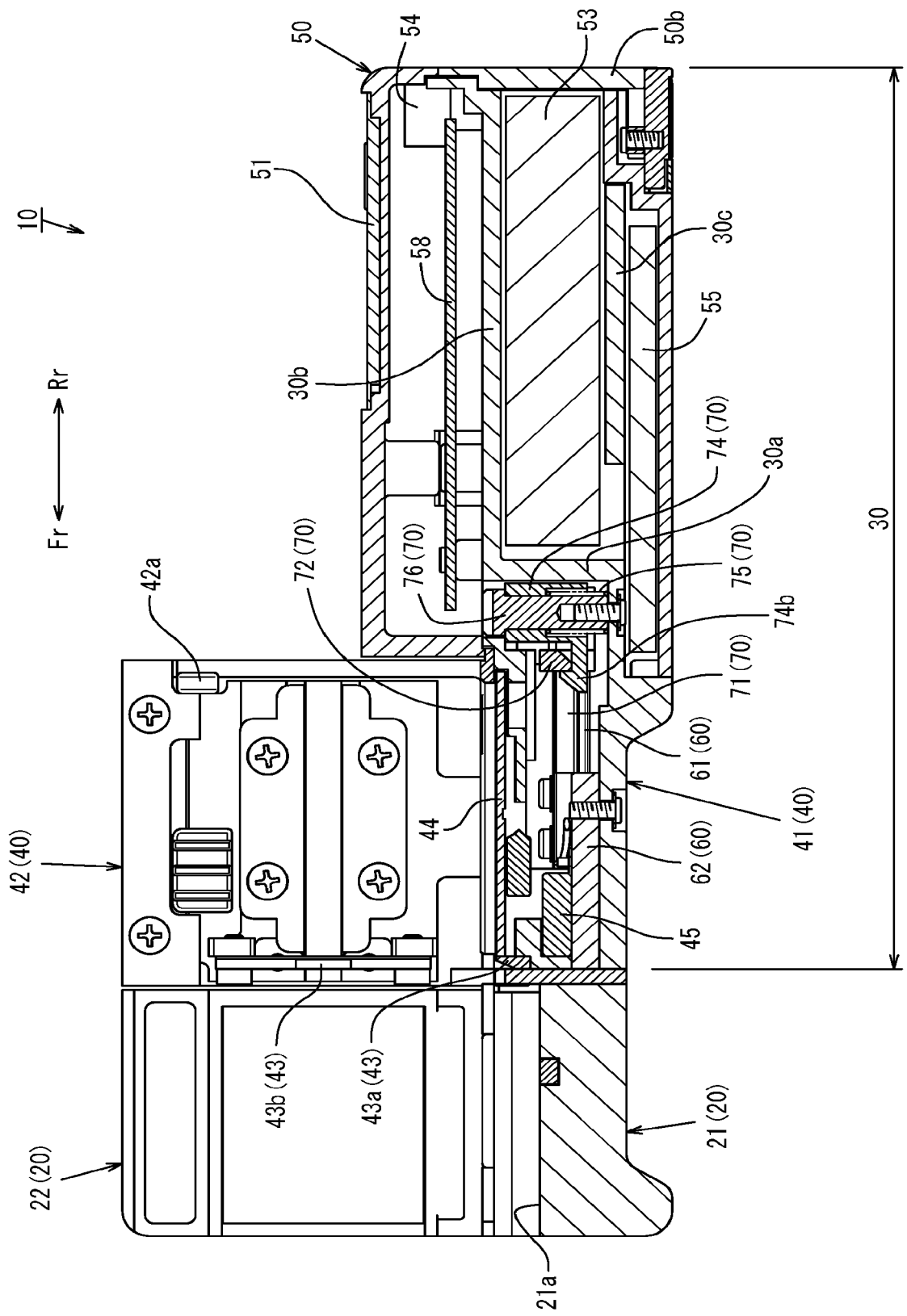
FIG. 9 is a cross-sectional view taken along line B-B in FIG. 4.
Figure 10A:
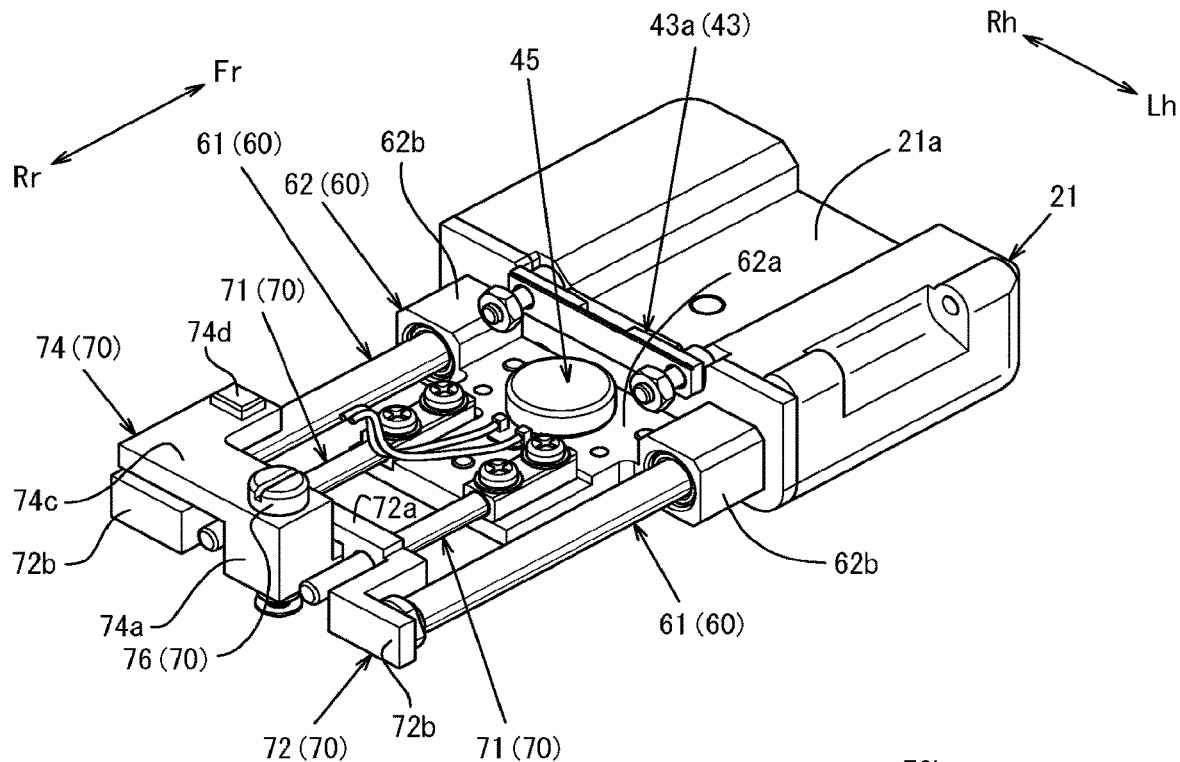
FIGS. 10A and 10B provide perspective views of a heating table in a state where a housing thereof is detached.
Figure 10B:
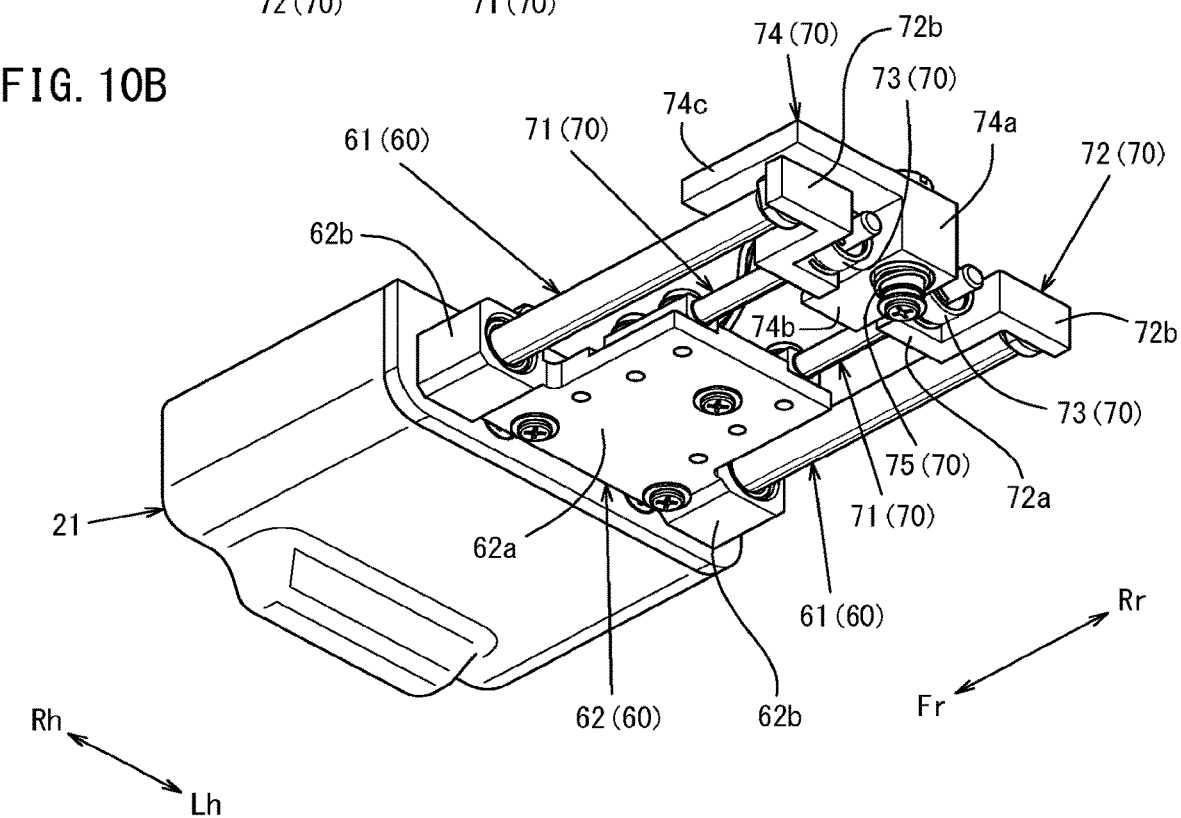

FIG. 9 is a cross-sectional view taken along line B-B in FIG. 4. FIGS. 10A and 10B provide perspective views of a heating table 41 in a state where a housing thereof is detached. FIG. 10A is a perspective view of a slide mechanism 60 and an assisting mechanism 70 as seen from a position to the rear of, and above, the slide mechanism 60 and the assisting mechanism 70. FIG. 10B is a perspective view of the slide mechanism 60 and the assisting mechanism 70 as seen from a position to the rear of, and below, the slide mechanism 60 and the assisting mechanism 70.

Figure 11A:
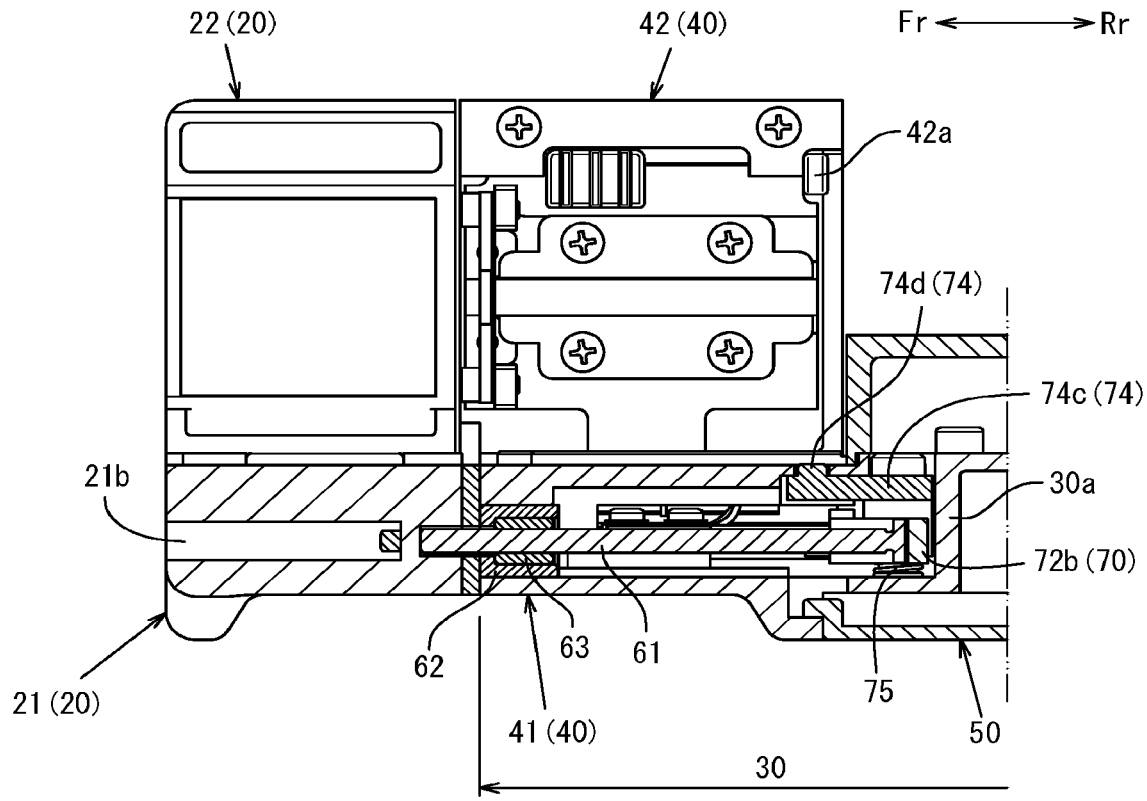
FIGS. 11A and 11B provide views showing a movement of a restriction member.
Figure 11B:
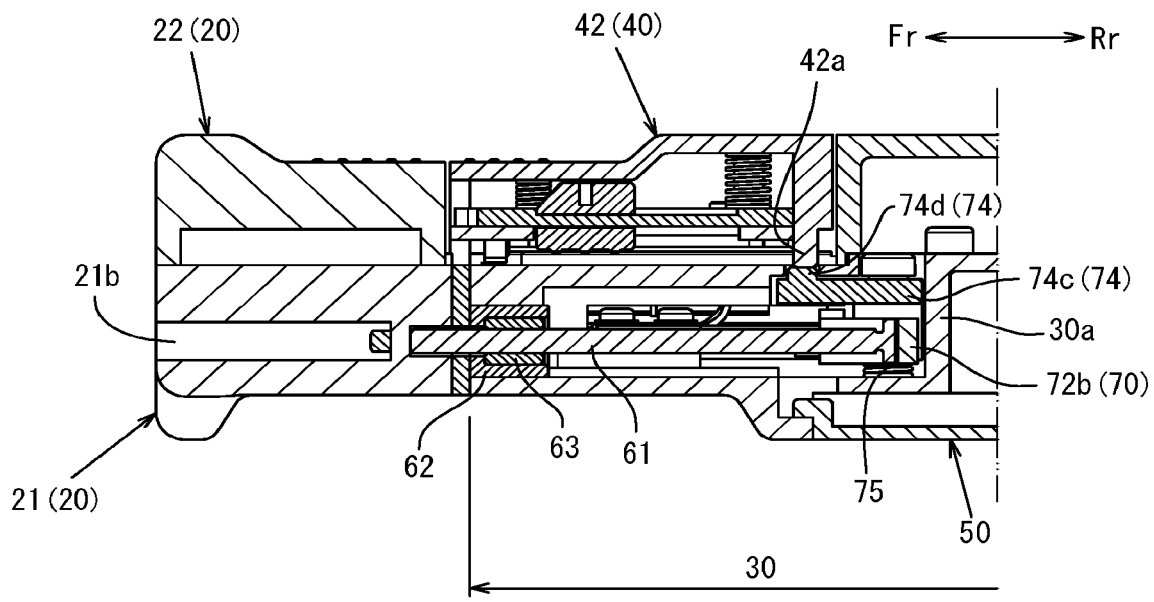

FIGS. 11A and 11B provide views showing a movement of a restriction member 74. FIG. 11A is a cross-sectional view taken along line C-C in FIG. 4, and shows a state where the heating lid 42 is opened. FIG. 11B is a cross-sectional view taken along line C-C FIG. 4, and shows a state where the heating lid 42 is closed.

In order to show the elements of the coating removal device 10 clearly, FIG. 3 omits a control board 58, FIG. 10A omits a pair of first urging springs 73, and FIGS. 11A and 11B omit a battery 53, a wireless charge receiver 55 and the control board 58.

In the figures, arrow Fr represents the "front" of the coating removal device 10, and arrow Rr represents the "rear" of the coating removal device 10. Arrow Rh represents the "right" of the coating removal device 10, and arrow Lh represents the "left" of the coating removal device 10. A direction defined by arrows Fr and Rr is a front-rear direction of the coating removal device 10, and a direction defined by arrows Rh and Lh is a width direction of the coating removal device 10. A direction perpendicular to both of the front-rear direction and the width direction is an up-down direction. Referring to FIG. 1, the side on which the heating lead 42 is provided is the top side of the coating removal device 10, and the opposite side thereto is the bottom side of the coating removal device 10.

The optical fiber 1 removable by the coating removal device 10 (see FIG. 1) in this embodiment may be a single core optical fiber or an optical fiber ribbon including a plurality of single core optical fibers located side by side, but is not limited to any of these. In this embodiment, a single core fiber will be described for easier description (hereinafter, the optical fiber 1 is a single core optical fiber).

Now, a structure of the optical fiber 1 will be described briefly. The optical fiber 1 is a primary coated fiber or a secondary jacketed fiber. As shown in FIG. 2, the optical fiber 1 includes a bare fiber 2 and a synthetic resin coating 3 coating an outer circumferential surface of the bare fiber 2.

As shown in FIG. 2, the bare fiber 2 includes a core 2a transmitting light and a clad 2b covering an outer circumferential surface of the core 2a.

The coating 3 is formed of one type of synthetic resin, or is a stack of layers of different types of synthetic resin.

As shown in FIG. 1, the coating removal device 10 removing the coating 3 of the optical fiber 1 includes a holding portion 20 holding the optical fiber 1 and a device main body 30 formed separately from the holding portion 20 and longer in the front-rear direction than the holding portion 20.

As shown in FIG. 3, the coating removal device 10 further includes the slide mechanism 60 allowing the holding portion 20 to slidably move with respect to the device main body 30, and the assisting mechanism 70 assisting the sliding movement of the holding portion 20.

As shown in FIG. 1, the holding portion 20 includes the holding table 21 recessed in a generally central portion in the width direction thereof, and a holding lid 22 supported to be opened or closed with respect to the holding table 21.

Specifically, as shown in FIG. 1, the holding table 21 includes a holder carrying portion 21a recessed at the generally central portion of a top surface thereof in the width direction. A holder 4 (see FIGS. 12A and 12B) attached to the optical fiber 1 is to be placed on the holder carrying portion 21a.

As shown in FIG. 3 and FIG. 5, the holding table 21 includes shaft holes 21b extending in the front-rear direction from a front surface to a rear surface of the holding table 21. The shaft holes 21b are respectively formed in the vicinity of ends of the holding table 21 in the width direction. As shown in FIG. 5, a slide shaft 61 of the slide mechanism 60 described below is inserted into each of the shaft holes 21b, and a front end of the slide shaft 61 is secured to the shaft hole 21b.

As shown in FIG. 1, the holding lid 22 is supported at a left end of the top surface of the holding table 21 while being pivotable about a rotation shaft extending in the front-rear direction. In a closed state, the holding lid 22 holds the holder 4 together with the holding table 21 to hold the optical fiber 1 inserted into the holder 4.

In an open state, the holding lid 22 is pivoted counterclockwise away from the top surface of the holding table 21 as seen in a front view as shown in FIG. 1. In the closed state, the holding lid 22 is pivoted clockwise to the top surface of the holding table 21 as seen in a front view.

As shown in FIG. 1, the device main body 30 includes a heating portion 40 heating the coating 3, and a main body portion 50 including an operation acceptance portion 51, the control board 58 and the like. The heating portion 40 and the main body portion 50 are integrally coupled with each other and located in this order from the front side to the rear side.

The heating portion 40 and the main body portion 50 are isolated from each other by an in-housing wall 30a (see FIG. 9) provided in a housing of the device main body 30. The device main body 30 further includes two partitions 30b and 30c (see FIG. 9) provided with a distance from each other in the up-down direction. The partitions 30b and 30c divide the inner space of the main body portion 50, and form spaces accommodating the battery 53, the wireless charge receiver 55 and the control board 58 described below.

As shown in FIG. 1, the heating portion 40 is located to the rear of the holding portion 20, and includes the heating table 41, on which the optical fiber 1 is to be placed, and the heating lid 42 covering the heating table 41.

As shown in FIG. 6, the heating table 41 has screw holes 41a in a bottom surface thereof. The screw holes 41a are provided, for example, in order to secure the coating removal device 10 to a predetermined installment position provided in a work line in which the coatings 3 are removed automatically and continuously. Although not shown in detail, the screw holes 41a each run through the housing of the heating table 41, and an inner wall of a base plate 62 (described below) exposed to each of the screw holes 41a has a thread formed therein.

As shown in FIG. 1, the heating lid 42 is supported at a left end of a top surface of the heating table 41 while being pivotable about a rotation shaft extending in the front-rear direction. As shown in FIG. 1, the heating lid 42 includes a pressing protrusion 42a protruding from a bottom surface thereof. The pressing protrusion 42a presses the restriction member 74 of the assisting mechanism 70 described below.

In an open state, the heating lid 42 is pivoted counterclockwise away from the top surface of the heating table 41 as seen in a front view as shown in FIG. 1. In a closed state, the heating lid 42 is pivoted clockwise to the top surface of the heating table 41 as seen in a front view.

As shown in FIG. 1, the main body portion 50 is located to the rear of the heating portion 40, and includes the operation acceptance portion 51 at a top surface thereof. The operation acceptance portion 51 includes a power button and the like.

As shown in FIG. 6, the main body portion 50 includes a USB (Universal Serial Bus) insertion hole 50a in a rear surface thereof. More specifically, the USB insertion hole 50a is formed at a top left portion of the rear surface. A USB cable (Type-C) is to be inserted into the USB insertion hole 50a.

As shown in FIG. 6, a part of the rear surface of the main body portion 50 that is below the USB insertion hole 50a is a cover 50b. The cover 50b is separated from the top portion of the rear surface so as to be detachable. As shown in FIG. 9, the cover 50b is provided so as to cover an opening that communicates the inner space, enclosed by the two partitions 30b and 30c, of the main body portion 50 and the outside of the main body portion 50 to each other.

The USB insertion hole 50a and the cover 50b described above are formed to act as a part of a dividing line of a housing of the main body portion 50. An edge around the USB insertion hole 50a and an edge around the opening covered with the cover 50b are provided with waterproof packing (not shown) preventing entrance of water.

As shown in FIG. 1 through FIG. 7, the device main body 30 having such a structure includes the cutting blade 43 making a cut in the coating 3 of the optical fiber 1 and a heater 44 heating a part of the coating 3 that is to the rear of the cutting blade 43 (that is closer to a tip of the coating 3).

As shown in FIG. 1 through FIG. 7, the device main body further includes the operation acceptance portion 51 accepting operations selected by the operator and a magnet switch 52 sensing whether the heating lid 42 is opened or closed.

As shown in FIG. 7, the device main body 30 includes the battery 53 supplying power to each of the elements, a USB connector (Type-C) and the wireless charge receiver 55 usable to charge the battery 53, LED lamps 56 notifying the operator of a state of each of the heating portion 40 and the main body portion 50, a buzzer portion 57, and a vibration motor 45.

As shown in FIG. 7, the device main body 30 includes a controller 59 mounted on the control board 58 (see FIG. 9) built in the main body portion 50 and controlling each of the elements of the coating removal device 10. The control board 58 is located in a top portion of the main body portion 50 such that a thickness direction thereof matches the up-down direction of the coating removal device 10 (see FIG. 9).

Each of the elements of the device main body 30 will be described in more detail.

As shown in FIG. 1 and FIGS. 8A-8C, the cutting blade 43 includes a bottom blade 43a secured to a front surface of the heating table 41 and a top blade 43b secured to a front surface of the heating lid 42. The cutting blade 43 is structured to make a cut in the coating 3 of the optical fiber 1 when the heating lid 42 is pivoted to cover the heating table 41 and thus the bottom blade 43a and the top blade 43b get close to each other.

Therefore, as shown in FIGS. 8A-8C, in a state where the heating lid 42 is closed, the bottom blade 43a and the top blade 43b certainly have an appropriate predetermined gap G therebetween having a size corresponding to the thickness of the coating 3. As shown in FIGS. 8A-8C, the predetermined gap G between the bottom blade 43a and the top blade 43b is certainly acquired by the gap adjustment piece 46 formed of a metal material and provided in a front right portion of the heating lid 42.

As shown in FIGS. 8A and 8B, the gap adjustment piece 46 allows the size of the predetermined gap G between the bottom blade 43a and the top blade 43b to be switched in accordance with the outer diameter of the coating 3.

For example, in the case where the coating 3 of the optical fiber 1 has an outer diameter of 250 μm, the gap adjustment piece 46 sets the size of the predetermined gap G to about 145 μm. In the case where the coating 3 of the optical fiber 1 has an outer diameter of 500 μm, the gap adjustment piece 46 sets the size of the predetermined gap G to about 300 μm.

Specifically, although not shown in detail, the gap adjustment piece 46 includes a shaft body extending in the front-rear direction and a flat portion extending like a generally flat plate in a tangential direction from an outer circumferential surface of the shaft body. The shaft body and the flat portion are integrally formed with each other.

As shown in FIG. 8C, the flat portion of the gap adjustment piece 46 is pivoted clockwise or counterclockwise about the shaft body acting as the rotation axis as seen in a front view, and thus the gap adjustment piece 46 forms the predetermined gap G.

The flat portion of the gap adjustment piece 46 is kept pivoted clockwise or counterclockwise as seen in a front view by a magnet (not shown) provided in the heating lid 42.

As shown in FIG. 8A, for example, the flat portion of the gap adjustment piece 46, when being pivoted counterclockwise as seen in a front view, is accommodated inside the heating lid 42, and thus the gap adjustment piece 46 sets the size of the predetermined gap G between the bottom blade 43a and the top blade 43b to about 145 μm.

By contrast, as shown in FIG. 8B, the flat portion of the gap adjustment piece 46, when being pivoted clockwise as seen in a front view, is located between the bottom blade 43a and the top blade 43b, and thus the gap adjustment piece 46 sets the size of the predetermined gap G between the bottom blade 43a and the top blade 43b to about 300 μm.

As shown in FIG. 1 and FIG. 4, the heater 44 has a generally rectangular shape longer in the front-rear direction as seen in a plan view, and is located on a generally central portion, in the width direction, of the top surface of the heating table 41. The heater 44 includes a ceramic heater or the like electrically connected with the controller 59 via a bus in the control board 58 built in the main body portion 50.

The heater 44 is controlled by the controller 59 such that the temperature thereof is raised to a level at which the adhesiveness between the bare fiber 2 and the coating 3 of the optical fiber 1 is sufficiently decreased, or such that the heater 44 generates heat until a predetermined time period passes after the coating 3 starts being heated.

As shown in FIG. 1 and FIG. 4, the operation acceptance portion 51 is located in a top rear portion of the main body portion 50. The operation acceptance portion 51 includes the power button, various setting buttons and the like electrically connected with the controller 59, and has a function of outputting a signal, indicating that a certain button has been pressed by the operator, to the controller 59.

The magnet switch 52 includes a magnet portion 52a (see FIG. 4) built in the heating lid 42 and a switch portion 52b (see FIG. 4) built in the main body portion 50 and electrically connected with the controller 59 via a bus in the control board 58. The magnet switch 52 is structured to form a closed circuit together with the controller 59 when, for example, the magnet portion 52a and the switch portion 52b get close to each other.

The battery 53 is charged via a USB cable or a wireless charger, and supplies power to each of the elements of the coating removal device 10.

Specifically, as shown in FIG. 9, the battery 53 is located in the inner space, enclosed by the two partitions 30b and 30c, of the main body portion 50, and is electrically connected with the control board 58 located above the battery 53.

The battery 53 is charged by the USB connector (Type-C) 54 or the wireless charge receiver 55.

The battery 53 is accommodated in the inner space of the main body portion 50 as being insertable and removable in the front-rear direction through the opening covered with the cover 50b.

As shown in FIG. 9, the USB connector (Type-C) 54 is mounted on a top surface of the control board 58, through the USB insertion opening 50a provided in the rear surface of the main body portion 50, in a direction in which the USB cable is insertable and removable in the front-rear direction. The USB connector (Type-C) 54 is electrically connected with the controller 59 via a bus in the control board 58, and has a function of sending and receiving various signals and also a function of accepting external power.

The wireless charge receiver 55 is a receiver in the wireless charger, and includes a charging coil or the like. As shown in FIG. 9, the wireless charge receiver 55 is built in the main body portion 50 so as to be located below the battery 53 and to be close to a bottom surface of the housing of the main body portion 50.

Namely, the wireless charge receiver 55, the battery 53 and the control board 58 are located in the main body portion 50 in this order from bottom to top. With such a structure, the battery 53 blocks transmission of heat generated by the wireless charge receiver 55 and noise generated by the coil of the wireless charge receiver 55 to the control board 58.

The wireless charge receiver 55 is electrically connected with the controller 59 via a bus in the control board 58.

As shown in FIG. 1, the LED lamps 56 are integrally provided in the operation acceptance portion 51, and are electrically connected with the controller 59 via a bus in the control board 58. The LED lamps 56 each have a function of notifying the operator of the state of the heating portion 40 by being turned on, turned off, or blinked under an instruction of the controller 59.

Although not shown in detail, the buzzer portion 57 is mounted on a top surface of the control board 58, and is electrically connected with the controller 59 via a bus in the control board 58. The buzzer portion 57 has a function of notifying the operator of the state of each of the heating portion 40 and the main body portion 50 by outputting a buzzer sound under an instruction of the controller 59.

As shown in FIG. 3 and FIG. 9, the vibration motor 45 is built in a front portion of the heating table 41, and is electrically connected with the controller 59 via a bus in the control board 58. The vibration motor 45 has a function of notifying the operator of the state of each of the heating portion 40 and the main body portion 50 by vibrating under an instruction of the controller 59.

Specifically, as shown in FIG. 10A, the vibration motor 45 is generally disc-shaped and is thin in the up-down direction. The vibration motor 45 is structured to vibrate in the front-rear direction and in the width direction.

The vibration motor 45 includes, for example, a rotation shaft extending in the up-down direction and a flat plate secured to the rotation shaft at a position different from the center of gravity thereof. With such a structure, the vibration motor 45 converts the rotation of the rotation shaft into a vibration in the front-rear direction and in the width direction.

As shown in FIG. 9 and FIG. 10A, the vibration motor 45 having such a structure is placed on, and secured to, a top surface of the base plate 62 of the slide mechanism 60 described below, at a position that is to the front of, and away by a predetermined distance from, the control board 58, and that is to the rear of, and close to, the bottom blade 43*a*.

The controller 59 includes hardware such as a CPU, a memory and the like mounted on the control board 58, and software such as a control program and the like. The controller 59 executes various programs and thus realizes a function of controlling an operation of each of the elements connected thereto via a predetermined bus.

The controller 59 realizes, for example, a function of heating the coating 3 of the optical fiber 1 via the heater 44, a function of determining the state of the heating portion 40, and a function of determining the state of the main body portion 50. The controller 50 further realizes a function of causing the LED lamps 56, the buzzer portion 57 and the vibration motor 45 to give information to the operator in accordance with the state of the heating portion 40.

The function of determining the state of each of the heating portion 40 and the main body portion 50 includes, for example, a heater diagnosis function of determining that the electrical conduction with the heater 44 is abnormal, a heating completion determination function of determining whether the heating of the coating 3 is completed or not, and a battery diagnosis function of determining the charged state of the battery 53 or determining that the battery 53 is abnormal.

The function of determining the state of each of the heating portion 40 and the main body portion 50 further includes, for example, a lamp diagnosis function of determining that the lamps 56 are not properly turned on, an operation acceptance diagnosis function of determining that the operation acceptance portion 51 is abnormal, and a buzzer diagnosis function of determining that the buzzer portion 57 is abnormal.

The function of causing the LED lamps 56, the buzzer portion 57 or the vibration motor 45 to give information to the operator includes, for example, a function of causing the LED lamps 56 to be turned on, causing the buzzer portion 57 to output a buzzer sound, and causing the vibration motor 45 to vibrate to notify the operator of an abnormality of the heater 44, the completion of the heating of the coating 3, and a charge state or an abnormality of the battery 53.

The function of causing the LED lamps 56, the buzzer portion 57 or the vibration motor 45 to give information to the operator includes a function of causing the buzzer portion 57 to output a buzzer sound and causing the vibration motor 45 to vibrate to notify the operator of an abnormality of LED lamps 56, and a function of causing the LED lamps 56 to be turned on, causing the buzzer portion 57 to output a buzzer sound and causing the vibration motor 45 to vibrate to notify the operator of an abnormality of the operation acceptance portion 51.

The function of causing the LED lamps 56, the buzzer portion 57 or the vibration motor 45 to give information to the operator further includes, for example, a function of causing the LED lamps 56 to be turned on and causing the vibration motor 45 to vibrate to notify the operator of an abnormality of the buzzer portion 57.

As shown in FIG. 3 and FIGS. 10A and 10B, the slide mechanism 60 is located in the heating portion 40. The slide mechanism 60 supports the holding portion 20, and allows the holding portion 20 to slidably move in the axial direction of the optical fiber 1 held by the holding portion 20, namely, in the front-rear direction.

As shown in FIGS. 10A and 10B, the slide mechanism 60 includes a pair of (left and right) slide shafts 61 located with a predetermined distance therebetween in the width direction, and the base plate 62 formed of a metal material and slidably supporting the slide shafts 61.

This will be described in more detail. As shown in FIGS. 10A and 10B, the slide shafts 61 each include a generally cylindrical shaft portion extending in the front-rear direction and a rear end portion formed at a rear end of, and integrally with, the shaft portion. The rear end portion is generally disc-shaped and has a diameter longer than that of the shaft portion. As shown in FIG. 5, the front end of the slide shaft 61 is tightened and secured to a housing of the holding table 21.

The slide shaft 61 has a length in the front-rear direction with which the rear end portion is close to, or contacts, a pressing member 72 of the assisting mechanism 70 described below, in a state where the holding portion 20 is in contact with the heating portion 40.

As shown in FIG. 9 and FIGS. 10A and 10B, the base plate includes a generally plate-like secured portion 62*a* tightened and secured to the bottom surface of the housing of the heating table 41, at a position to the rear of, and close to, the bottom blade 43*a*, and also includes generally cylindrical shaft supporting portions 62*b* provided at both of ends in the width direction of the secured portion 62*a* and extending in the front-rear direction. The secured portion 62*a* and the shaft supporting portions 62*b* are formed integrally with each other.

As shown in FIG. 10A, the vibration motor 45 is placed on, and secured to, a top surface of the secured portion 62*a* of the base plate 62, at a position close to the bottom blade 43*a*.

As shown in FIG. 5, the shaft supporting portions 62*b* of the base plate 62 each support the shaft portion of the corresponding slide shaft 61 via a bush 63 located in the base plate 62.

As shown in FIG. 3 and FIGS. 10A and 10B, the assisting mechanism 70 is located in the heating portion 40. In a state where the holding portion 20 is holding the optical fiber 1, the assisting mechanism 70 provides the holding portion 20 with a forward urging force to assist the sliding movement of the holding portion 20.

The assisting mechanism 70 includes a mechanism that in a state where the holding portion 20 is not holding the optical fiber 1, uses an upward urging force to restrict the provision of the forward urging force to the holding portion 20.

This will be described in more detail. As shown in FIGS. 10A and 10B, the assisting mechanism 70 includes a pair of cylindrical rod members 71 extending in the front-rear direction between the slide shafts 61, the pressing member 72 supported by the cylindrical rod members 71 while being in contact with the rear end portions of the slide shafts 61, and the pair of first urging springs 73 providing the pressing member 72 with a forward urging force.

As shown in FIG. 3, FIG. 9 and FIGS. 10A and 10B, the assisting mechanism 70 includes members that restrict the provision of the forward urging force to the holding portion 20. Such members include a restriction member 74 engaged with the pressing member 72 and a second urging spring 75 providing the restriction member 74 with an upward urging force.

As shown in FIGS. 10A and 10B, the pair of cylindrical rod members 71 are located away from each other by a predetermined distance in the width direction, and each have a front end tightened and secured to the secured portion 62a of the base plate 62. The cylindrical rod members 71 each have a length in the front-rear direction with which a rear end thereof is generally flush with a rear surface of the restriction member 74.

As shown in FIGS. 10A and 10B, the pressing member 72 includes a flat plate-like central portion 72a located between the pair of slide shafts 61, and end portions 72b adjacent to both of ends, in the width direction, of the central portion 72a. The central portion 72a and the end portions 72b are integrally formed with each other.

Specifically, as shown in FIGS. 10A and 10B, the central portion 72a of the pressing member 72 is flat plate-like and has a thickness in the front-rear direction. As shown in FIG. 9 and FIGS. 10A and 10B, the central portion 72a has a recess opened upward at a generally central position in the width direction and also has openings through which the cylindrical rod members 71 are inserted. The openings are located outer to the recess in the width direction.

As shown in FIGS. 10A and 10B, the end portions 72b of the pressing member 72 extend rearward from the ends in the width direction of the central portion 72a and then extend outward in the width direction so as to face the rear end portions of the slide shafts 61. As shown in FIGS. 10A and 10B, the end portions 72b of the pressing member 72 are located to be close to, or to contact, the rear end portions of the slide shafts 61 in a state where the holding portion 20 is in contact with the heating portion 40.

As shown in FIG. 10B, the pair of first urging springs 73 are so-called coil springs, and are outserted around the cylindrical rod members 71 protruding rearward beyond the pressing member 72. Each of the first urging springs 73 has a front end contacting the central portion 72a of the pressing member 72 and has a rear end contacting the in-housing wall 30a isolating the heating portion 40 and the main body portion 50 from each other. With such a structure, the first urging springs 73 each provide the pressing member 72 with a forward urging force.

As shown in FIG. 3, FIG. 9 and FIGS. 10A and 10B, the restriction member 74 is located to the rear of the pressing member 72. The restriction member 74 includes a spring accommodation portion 74a accommodating the second urging spring 75, an engaging portion 74b extending forward from the spring accommodation portion 74a via an area below the pressing member 72 to be engaged with the pressing member 72, and an extending portion 74c extending rightward in the width direction from the spring accommodation portion 74a via an area above the pressing member 72. The spring accommodation portion 74a, the engaging portion 74b and the extending portion 74c are integrally formed together.

As shown in FIG. 9, a column-like member 76 extends in the up-down direction and has a bottom end tightened and secured to the bottom surface of the housing of the heating table 41. The column-like member 76 is inserted into the spring accommodation portion 74a, and thus the restriction member 74 is supported.

This will be described specifically. As shown in FIG. 9 and FIGS. 10A and 10B, the spring accommodation portion 74a has a recess extending upward and accommodating the second urging spring 75, and also has an insertion opening into which the column-like member 76 is inserted.

As shown in FIG. 3 and FIG. 9, the engaging portion 74b is shaped so as to have a tip claw protruding upward at a position to the front of the pressing member 72.

As shown in FIG. 10A, the extending portion 74c extends rightward from the spring accommodation portion 74a and then extends forward. As shown in FIG. 10A, a rectangular protrusion 74d having a generally rectangular shape as seen in a plan view and protruding upward is provided at a tip of the extending portion 74c.

As shown in FIGS. 11A and 11B, the rectangular protrusion 74d is in loose engagement with the opening provided at a right portion of the top surface of the heating table 41, such that in a state where the heating lid 42 is closed, the pressing protrusion 42a of the heating lid 42 contacts the rectangular protrusion 74d.

The second urging spring 75 is a so-called coil spring. As shown in FIG. 9 and FIGS. 10A and 10B, the second urging spring 75 is accommodated in the spring accommodation portion 74a of the restriction member 74 in a state of being outserted around the column-like member 76. The second urging spring 75 has a top end contacting the restriction member 74 and a bottom end contacting the bottom surface of the housing of the heating table 41. With such a structure, the second urging spring 75 provides the restriction member 74 with an upward urging force.

As shown in FIG. 9, in the coating removal device 10 including the assisting mechanism 70 having such a structure, the engaging portion 74b of the restriction member 74 is engaged with the pressing member 72 by the urging force of the second urging spring 75, in a state where the holding lid 22 is opened.

Now, steps of heating the optical fiber 1 and removing the coating 3 by the coating removal device 10 having the above-described structure will be described with reference to FIGS. 12A and 12B through FIG. 14.

Figure 12A:
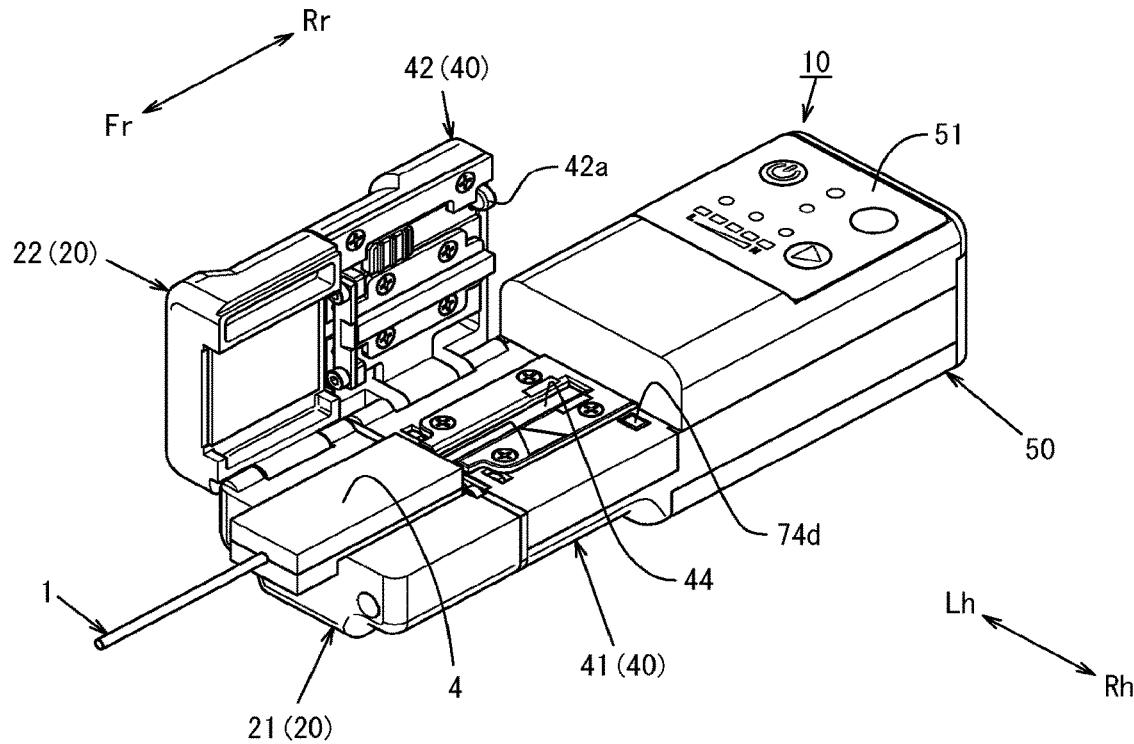
FIGS. 12A and 12B provide schematic views illustrating steps of removing the coating of the optical fiber.
Figure 12B:
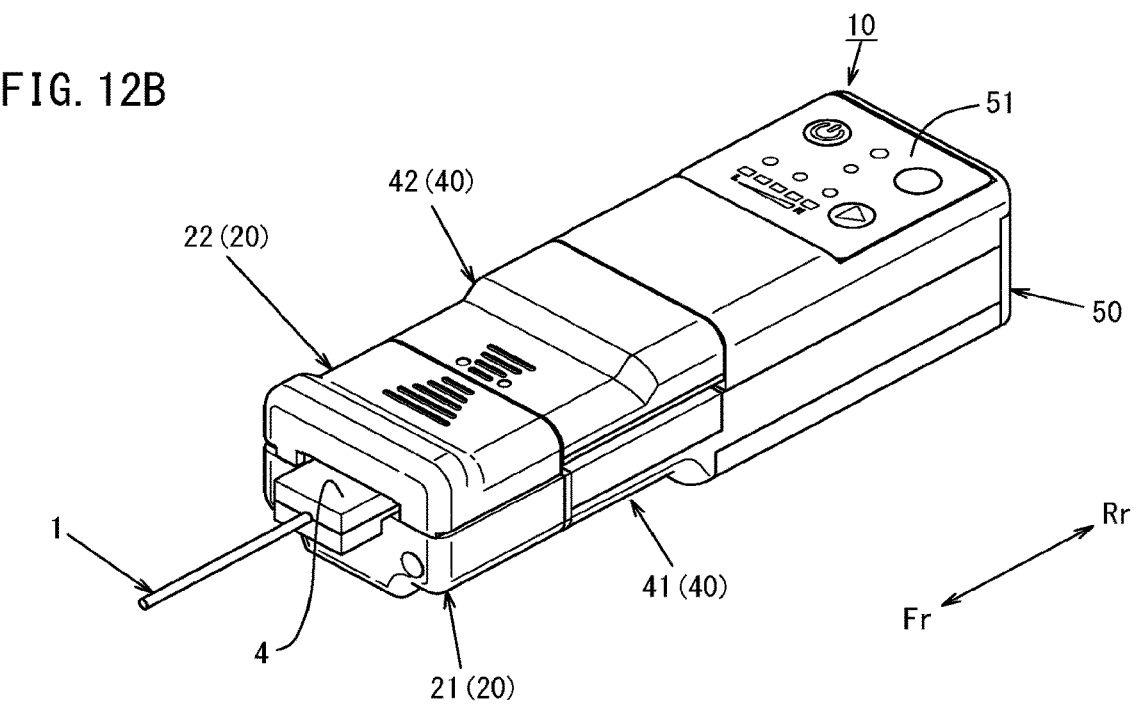

FIGS. 12A and 12B provide schematic views illustrating steps of removing the coating 3 of the optical fiber 1. FIG. 12A is an external perspective view of the coating removal device 10 in a state where the optical fiber 1 is placed thereon. FIG. 12B is an external perspective view of the coating removal device 10 in a state where the holding lid 22 and the heating lid 42 are closed.

Figure 13:
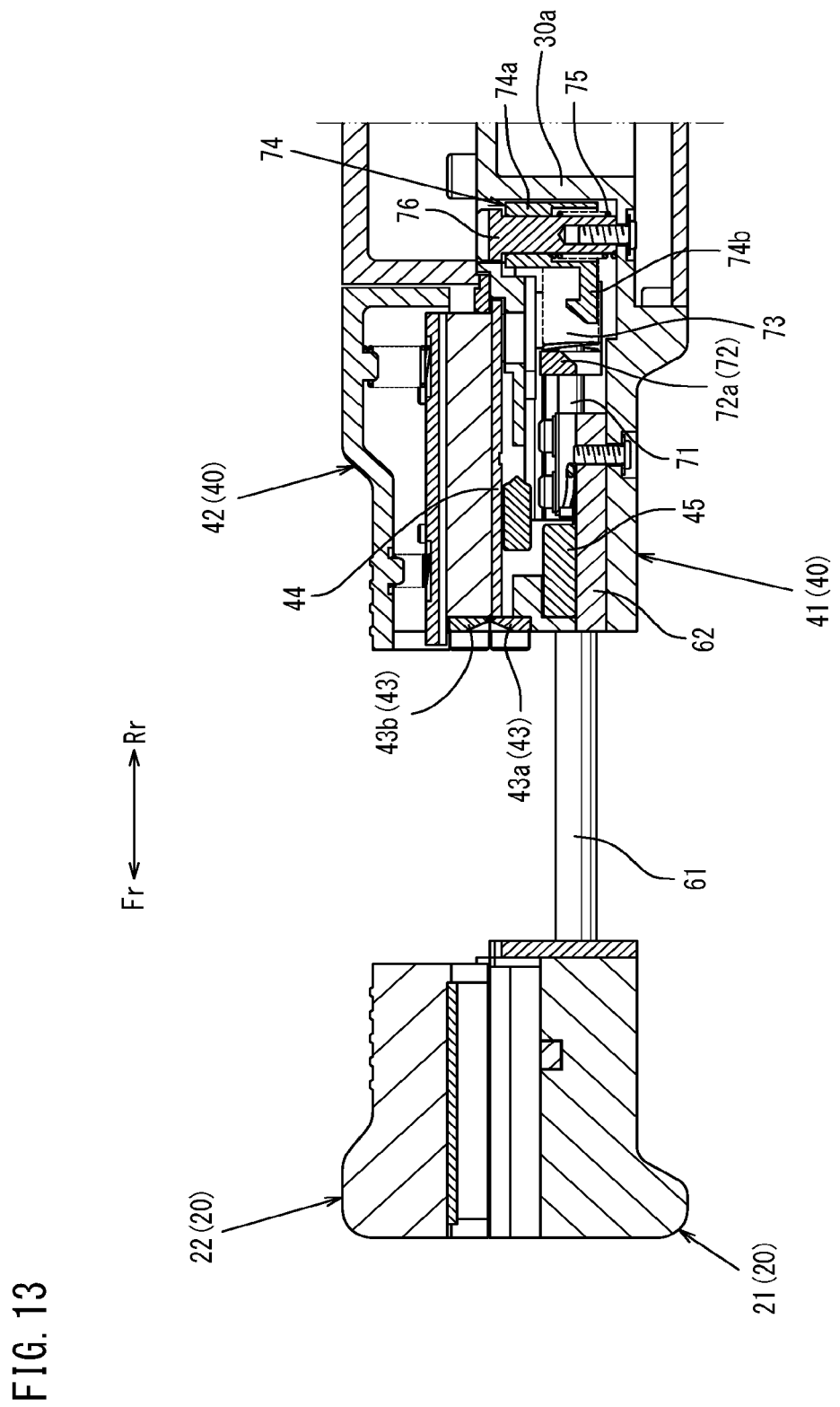
FIG. 13 is a cross-sectional view of the coating removal device taken along line B-B in FIG. 4 in a state where a pressing member presses a slide shaft.
Figure 14:
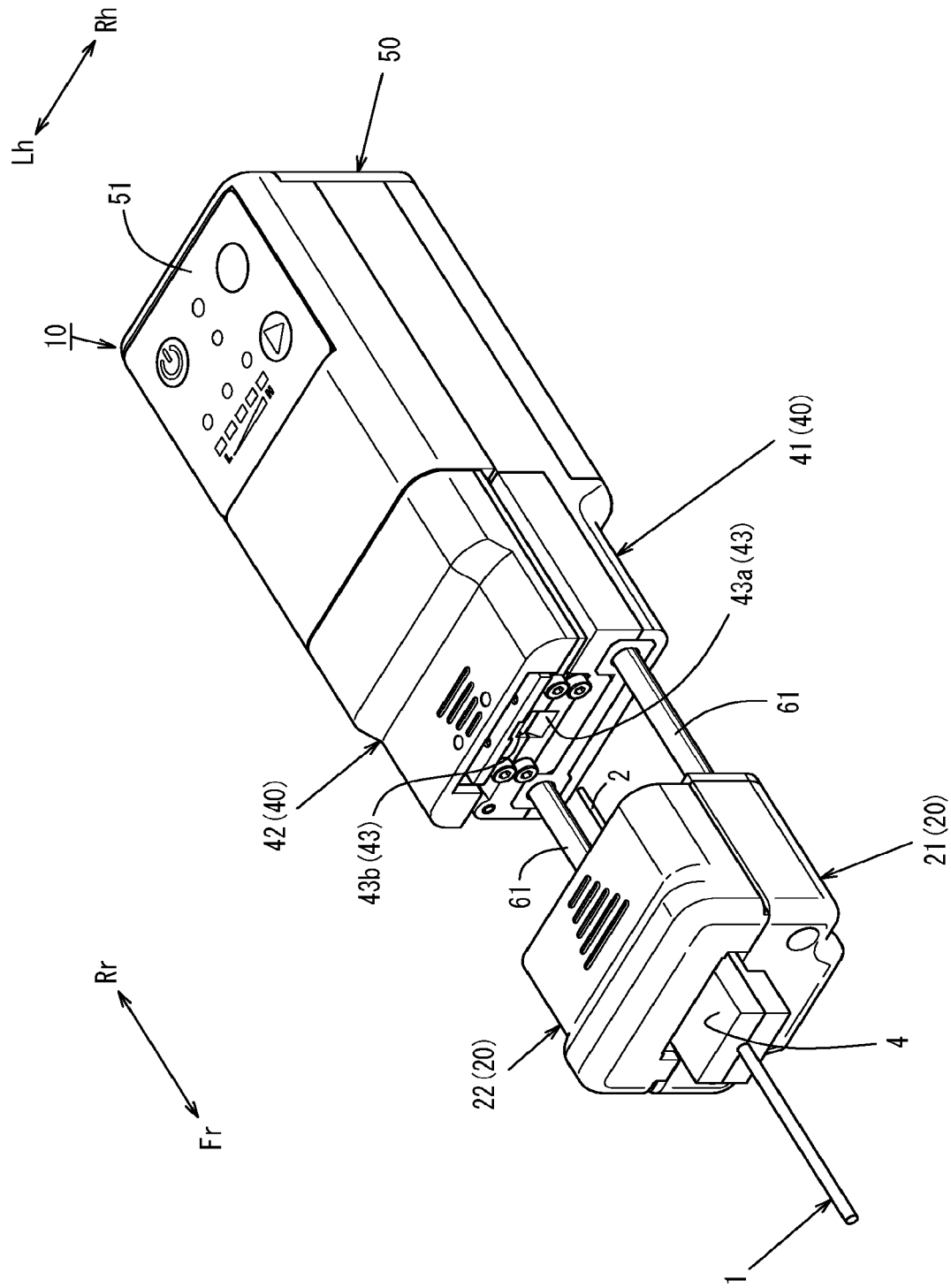
FIG. 14 is an external perspective view of the coating removal device in a state where a holding portion is slid to move.

FIG. 13 is a cross-sectional view of the coating removal device 10 in a state where the pressing member 72 presses the slide shaft 61. FIG. 14 is an external perspective view of the coating removal device 10 in a state where the holding portion 20 is slid to move.

In order to show the elements of the coating removal device 10 clearly, FIG. 13 omits the optical fiber 1, the holder 4, the battery 53, the wireless charge receiver 55 and the control board 58.

First, the operator operates the operation acceptance portion 51 of the coating removal device 10 to press the power button. When the power button is pressed, the controller 59 of the coating removal device 10 repeatedly determines the state of each of the heating portion 40 and the main body portion 50 by the heater diagnosis function, the battery diagnosis function, the lamp diagnosis function, the operation acceptance diagnosis function and the buzzer diagnosis function, until the power button is pressed again.

In the case where the coating removal device 10 finds that an abnormality has occurred to any of the heating portion 40 and the main body portion 50, the controller 59 turns on the LED lamps 56, causes the buzzer portion 57 to output a buzzer sound and vibrates the vibration motor 45 to notify the operator of the abnormality of the heating portion 40 or the main body portion 50.

After pressing the power button, the operator places the optical fiber 1 provided with the holder 4 on the coating removal device 10 in a state where the holding portion 20 is in contact with the heating portion 40.

Specifically, as shown in FIG. 12A, the operator places the holder 4 on the holder carrying portion 21a of the holding table 21 of the holding portion 20, and places a part of the optical fiber 1 that protrudes rearward from the holder 4 on the heater 44 on the heating table 41.

Then, as shown in FIG. 12B, the operator closes the holding lid 22 such that the holding lid 22 covers the top surface of the holding table 21. As a result, the holding portion 20 holds the optical fiber 1 via the holder 4.

As shown in FIG. 12B, the operator closes the heating lid 42 such that the heating lid 42 covers the top surface of the heating table 41. As a result, the heating portion 40 holds the optical fiber 1 and makes a cut in the coating 3 by the cutting blade 43.

After closing the holding lid 22 and the heating lid 42, the operator, for example, grabs a portion of the heating portion 40 that is in the vicinity of a front end thereof with his/her left hand and grabs the holding portion 20 with his/her right hand, in preparation of the sliding movement of the holding portion 20.

When the heating lid 42 is closed, the magnet portion 52a located in the heating lid 42 gets close to the switch portion 52b of the main body portion 50. Therefore, the magnet switch 52 forms a closed circuit. When sensing that the magnet switch 52 has formed the closed circuit, the controller 59 of the coating removal device 10 supplies power to the heater 44 to start heating the coating 3.

When the temperature of the heater 44 is raised to a level at which the adhesiveness between the coating 3 and the bare fiber 2 is sufficiently decreased or until a predetermined time period passes, the controller 59 turns on the LED lamps 56, causes the buzzer portion 57 to output a buzzer sound and vibrates the vibration motor 45 to notify the operator that the heating of the coating 3 is completed.

In this step, the controller 59 notifies the operator by causing the buzzer portion 57 to output a buzzer sound and vibrating the vibration motor 45 for a predetermined time period, and notifies the operator by turning on the LED lamps 56 until the heating lid 42 is opened.

When learning that the heating of the coating 3 is completed, the operator pulls the holding portion 20 forward with his/her right hand while pressing the heating lid 42 with his/her left hand against the urging force of the second urging spring 75.

In this step, the pressing protrusion 42a of the heating lid 42 presses the rectangular protrusion 74d of the assisting mechanism 70. Therefore, as shown in FIGS. 11A and 11B and FIG. 13, the restriction member 74 moves downward against the urging force of the second urging spring 75. As a result, the engaging portion 74b is detached from the pressing member 72. In this manner, the assisting mechanism 70 disengages the restriction member 74 from the pressing member 72.

As shown in FIG. 13, when the engaging portion 74b of the restriction member 74 is disengaged from the pressing member 72, the first urging springs 73 of the assisting mechanism 70 start pressing the central portion 72a of the pressing member 72 forward. In this step, the end portions 72b of the pressing member 72 contact and press the rear end portions of the slide shafts 61. Therefore, the holding portion 20 is pressed forward via the slide shafts 61.

Namely, the holding portion 20 is acted on by a forward tensile load provided by the operator and by the forward urging force of the first urging springs 73. With such an arrangement, the assisting mechanism 70 assists the operator in an operation of slidably moving the holding portion 20, by the urging force of the first urging springs 73, and thus allows the holding portion 20 to slidably move easily with respect to the heating portion 40.

As shown in FIG. 14, the coating removal device 10 removes the coating 3 of the optical fiber 1 by the forward sliding movement of the holding portion 20 and exposes the bare fiber 2.

As described above, the coating removal device 10 removes the coating 3 of the optical fiber 1 in the front-rear direction. The coating removal device 10 includes the heating portion 40 including the cutting blade 43 making a cut in the coating 3 of the optical fiber 1 and the heater 44 heating a part of the coating 3 that is closer to the tip thereof than the cutting blade 43; the main body portion 50 including the control board 58 electrically connected with the heater 44; and the holding portion 20 holding the optical fiber 1 while being located on the opposite side to the heater 44 with the cutting blade 43 being provided therebetween.

The coating removal device 10 further includes the slide mechanism 60 allowing the holding portion 20 to slidably move with respect to the heating portion 40 such that the heating portion 40 is distanced away from the heating portion 40 in the front-rear direction. The main body portion 50, the heating portion 40 and the holding portion 20 are located in this order from the rear side to the front side of the coating removal device 10.

The heating portion 40 includes the vibration motor 45 vibrating to give information to the operator.

The coating removal device 10 having such a structure may easily give information to the operator.

This will be described specifically. When grabbing the coating removal device 10, the operator often grabs the heating portion 40, instead of the main body portion 50, with one of his/her hands. Since the vibration motor 45 is provided in the heating portion 40, the coating removal device 10 may transmit the vibration of the vibration motor 45 to the operator more certainly than in the case where a vibration motor is provided in the main body portion 50.

Therefore, the operator may tactually sense the information given to him/her even when not looking at the coating removal device 10.

Since the operator does not need to keep looking at the coating removal device 10, the coating removal device 10 may decrease the load on the operator and also easily allows the operator to look at an optical fiber 1 to be processed next while heating the coating 3. Therefore, the coating removal device 10 may improve the work efficiency as well as giving the information to the operator.

In addition, the vibration motor 45 may be located away from the control board 58 in the front-rear direction. Therefore, the coating removal device 10 may suppress the transmission of the vibration of the vibration motor 45 to the control board 58 with no need to provide a damping member. For this reason, the coating removal device 10 may prevent inconvenience from being occurred unintentionally to the control board 58 by the vibration of the vibration motor 45.

The vibration motor 45 is located close to the cutting blade 43 of the heating portion 40.

With such a structure, the coating removal device 10 may transmit the vibration of the vibration motor 45 to the operator more certainly.

This will be described specifically. The operator often grabs the heating portion 40 at a position close to the cutting blade 43 in order to allow a tensile force for the sliding movement to act on the holding portion 20 and in order to remove the coating 3 with certainty. Since the vibration motor 45 is located close to the cutting blade 43, the coating removal device 10 may transmit the vibration of the vibration motor 45 to the operator more certainly than in the case where the vibration motor 45 is located far from the cutting blade 43.

The heating portion 40 includes the metal base plate 62 secured to a housing thereof. The vibration motor 45 is secured to the base plate 62.

With such a structure, the coating removal device 10 may amplify the vibration by the metal base plate 62 and transmit such an amplified vibration to the housing of the heating portion 40.

Therefore, the coating removal device 10 may transmit the vibration of the vibration motor 45 to the operator with certainty even if the vibration motor 45 is small. For this reason, the operator may learn of information given to him/her even when merely touching the housing.

In addition, the coating removal device 10 may suppress an increase in the size thereof even though including the vibration motor 45.

The slide mechanism 60 includes the slide shafts 61 each having an end secured to the holding portion 20. The base plate 62 slidably supports the slide shafts 61.

With such a structure, the coating removal device 10 may support the slide shafts 61 with certainty, and thus may further stabilize the sliding movement of the holding portion 20.

The coating removal device 10 may transmit the vibration of the vibration motor 45 also to the holding portion 20 via the slide shafts 61. Therefore, the coating removal device 10 may transmit the vibration of the vibration motor 45 to both of the hand of the operator grabbing the heating portion 40 and the hand of the operator grabbing the holding portion 20. With such an arrangement, the coating removal device 10 may give information to the operator more certainly.

The coating removal device 10 includes the assisting mechanism 70, which in a state where the holding portion 20 is holding the optical fiber 1, provides the holding portion 20 with an urging force acting in the front-rear direction to assist the sliding movement of the holding portion 20. The assisting mechanism 70 includes the restriction member 74, which in a state where the holding portion 20 is not holding the optical fiber 1, uses an urging force acting in the up-down direction to restrict the provision of the urging force to the holding portion 20. The vibration motor 45 vibrates in a direction generally perpendicular to the up-down direction.

With such a structure, the coating removal device 10 may allow the holding portion 20 to slidably move easily by the assisting mechanism 70.

In addition, the direction of the urging force acting on the restriction member 74 and the vibration direction of the vibration motor 45 are generally perpendicular to each other. Therefore, the coating removal device 10 may prevent the urging force acting on the restriction member 74 from being varied by the vibration of the vibration motor 45.

With such an arrangement, the coating removal device 10 may prevent a state where the provision of the urging force to the holding portion 20 is restricted by the restriction member 74 from being cancelled by the vibration of the vibration motor 45. Therefore, the coating removal device 10 may prevent the holding portion 20 from slidably moving unintentionally.

The main body portion 50 includes the controller 59 controlling the operation of each of the heater 44 and the vibration motor 45. The controller 59 vibrates the vibration motor 45 when the heating of the coating 3 is completed.

With such a structure, the coating removal device 10 may notify the operator that the heating of the coating 3 is completed even when the operator is not looking at the coating removal device 10 or even when the operator is at a noisy site.

The heating portion 40 has the screw holes 41a usable to secure the coating removal device 10 at a predetermined installment position in the work line.

With such a structure, the coating removal device 10 may be secured for use at a predetermined installment position, in the work line, at which the coating 3 of the optical fiber 1 is to be removed and a connector or the like is to be attached to the optical fiber 1.

The screw holes 41a each run through the housing of the heating table 41, and an inner wall of a base plate 62 exposed to each of the screw holes 41a has a thread formed therein. Therefore, the coating removal device 10 may transmit the vibration of the vibration motor 45 amplified by the base plate 62 to the predetermined installment position. For this reason, the coating removal device 10 may give information to the operator more certainly.

The coating removal device 10 includes the buzzer portion 57 giving information to the operator by a buzzer sound.

With such a structure, the coating removal device 10 may give information to the operator by the vibration of the vibration motor 45 and the buzzer sound output by the buzzer portion 57. Namely, the operator may learn of the information given to him/her tactically and acoustically. Therefore, the coating removal device 10 may give information to the operator more certainly.

The cutting blade 43 includes the bottom blade 43a and the top blade 43b making a cut while holding the coating 3 therebetween. The heating portion 40 includes the gap adjustment piece 46 pivotable to change the size of the predetermined gap G between the bottom blade 43a and the top blade 43b.

With such a structure, the coating removal device 10 may easily change the size of the predetermined gap G between the bottom blade 43*a* and the top blade 43*b* without detaching or attaching the cutting blade 43. Therefore, the coating removal device 10 may, for example, easily remove the coating 3 of the optical fiber 1 having a different thickness from that of a previous coating, at a site where the optical fiber 1 is connected with a connector or the like.

In a state where the holding portion 20 is holding the optical fiber 1, the assisting mechanism 70 provides the holding portion 20 with an urging force acting in the front-rear direction to assist the sliding movement of the holding portion 20. Therefore, the coating removal device 10 including the assisting mechanism 70 may assist the operator in an operation of slidably moving the holding portion 20, and thus may alleviate the load on the operator.

The USB cable and the battery 53 are inserted in the same direction and are detached in the same direction. Therefore, the coating removal device 10 may easily supply power via the USB cable and replace the battery 53 even in the case of, for example, being secured at a predetermined installment position in the work line. Therefore, the coating removal device 10 may improve the ease of operation of certainly acquiring the power.

Since the USB cable and the battery 53 are inserted in the same direction and are detached in the same direction, the coating removal device 10 may limit the entrance route of water more than in the case where the USB cable and the battery 53 are inserted in different directions and are detached in different directions. Therefore, the coating removal device 10 may simplify the water shut-off structure.

The axial direction of the optical fiber according to the present invention corresponds to the front-rear direction in the above-described embodiment; and similarly, the information to be given to the operator corresponds to an abnormality of the heater 44, the completion of the heating of the coating 3, the charged state or an abnormality of the battery 53, an abnormality of the LED lamps 56, an abnormality of the operation acceptance portion 51, or an abnormality of the buzzer portion 57;

the vibration notification portion corresponds to the vibration motor 45;

the predetermined direction corresponds to the front-rear direction;

the direction generally perpendicular to the predetermined direction corresponds to the up-down direction; and the gap adjustment portion corresponds to the gap adjustment piece 46.

However, the present invention is not limited to having the structure in the above-described embodiment, and may be carried out in any of various other embodiments.

For example, in the above-described embodiment, in the case where any of the completion of the heating of the coating 3, an abnormality of the heater 44, the charged state or an abnormality of the battery 53, an abnormality of the LED lamps 56, an abnormality of the operation acceptance portion 51, and an abnormality of the buzzer portion 57 is sensed, such a state is notified by the vibration of the vibration motor 45. The present invention is not limited to this. The coating removal device 10 may be structured to notify at least one of the above-described states by the vibration of the vibration motor 45.

The controller 59 may determine whether to vibrate the vibration motor 45 or to cause the buzzer portion 57 to output a buzzer sound in accordance with the state of the heating portion 40 and the state of the main body portion 50. For example, the controller 59 may, in the case of sensing an abnormality of the heater 44 or an abnormality of the battery 53, give such information to the operator by the vibration of the vibration motor 45, whereas in the case of sensing the completion of the heating of the coating 3, give such information to the operator by causing the buzzer portion 57 to output a buzzer sound.

In this manner, the vibration motor 45 is vibrated or the buzzer portion 57 is caused to output a buzzer sound, in accordance with the type of information to be given to the operator. With such an arrangement, the coating removal device 10 may allow the operator to distinguish the information more easily.

In the above-described embodiment, the completion of the heating of the coating 3 is notified by the vibration of the vibration motor 45 and the buzzer sound output by the buzzer portion 57. Alternatively, the completion of the heating of the coating 3 may be notified by either one of the vibration of the vibration motor 45 and the buzzer sound that is output by the buzzer portion 57. In this case, whether the completion of the heating of the coating 3 is to be notified by the vibration of the vibration motor 45, the buzzer sound that is output by the buzzer portion 57, or both of them may be selected by the operator and accepted by the operation acceptance portion 51.

With such an arrangement, the coating removal device 10 may allow the operator to select whether to vibrate the vibration motor 45 or to cause the buzzer portion 57 to output a buzzer sound, in accordance with, for example, the environment of the site where the coating 3 is removed.

The color of the LED lamps 56 may be changed in accordance with the settings accepted by the operation acceptance portion 51 to notify the operator whether the completion of the heating of the coating 3 is to be notified by the vibration, the sound, or both of them. For example, in the case where the completion of the heating of the coating 3 is to be notified by the vibration of the vibration motor 45, the LED lamps 56 may be lit yellow; in the case where the completion of the heating of the coating 3 is to be notified by the buzzer sound output by the buzzer portion 57, the LED lamps 56 may be lit blue; and in the case where the completion of the heating of the coating 3 is to be notified by both of the vibration of the vibration motor 45 and the buzzer sound output by the buzzer portion 57, the LED lamps 56 may be lit green.

In the above-described embodiment, the controller 59 gives information to the operator by vibrating the vibration motor 45 only for a predetermined time period. The present invention is not limited to this. For example, the notification by the vibration of the vibration motor 45 may be performed until the heating lid 42 is opened.

In the above-described embodiment, the magnet switch 52 of the device main body 30 forms a closed circuit when the magnet portion 52*a* and the switch portion 52*b* get close to each other. The present invention is not limited to this. The magnet switch 52 may form an open circuit when the magnet portion 52*a* and the switch portion 52*b* get close to each other. In this case, the controller 59 senses that the magnet switch 52 has formed the open circuit, and supplies power to the heater 44.

In the above-described embodiment, the vibration motor 45 is vibrated to give information to the operator. The present invention is not limited to this. Any appropriate element that may give information to the operator by vibration may be used.

In the above-described embodiment, the vibration motor 45 is located on the bottom surface of the housing of the heating table 41. The present invention is not limited to this. The vibration motor 45 may be located on a side surface, in the width direction, of the housing of the heating table 41. The vibration motor 45 may vibrate in the up-down direction.

In this case, the assisting mechanism 70 may be structured such that the restriction member 74 is engaged with the pressing member 72 in the width direction and the second urging spring 75 provides the restriction member 74 with an urging force acting in the width direction.

Figure 15:
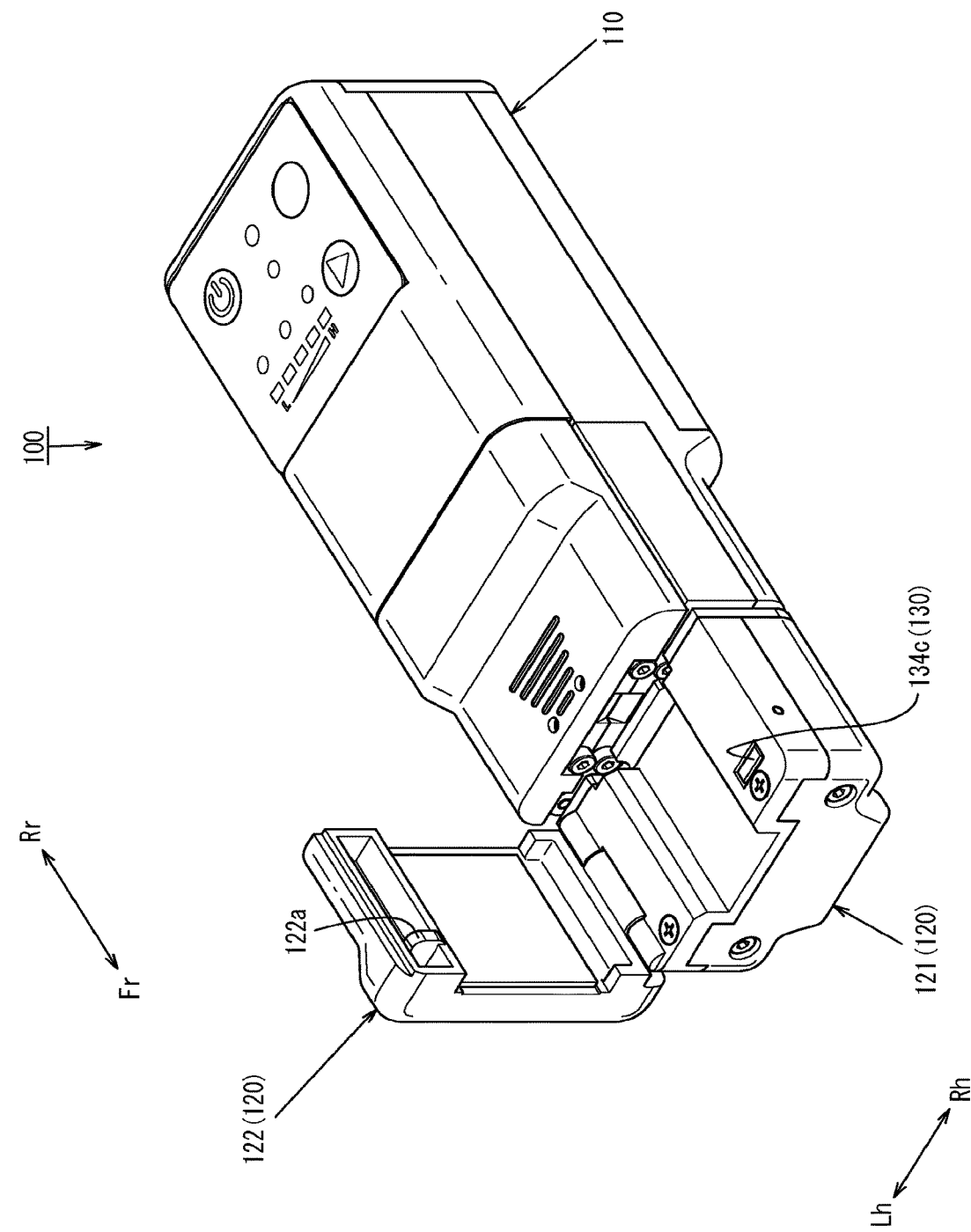
FIG. 15 is an external perspective view of a coating removal device in another embodiment as seen from a position to the front of, and above, the coating removal device.
Figure 16:
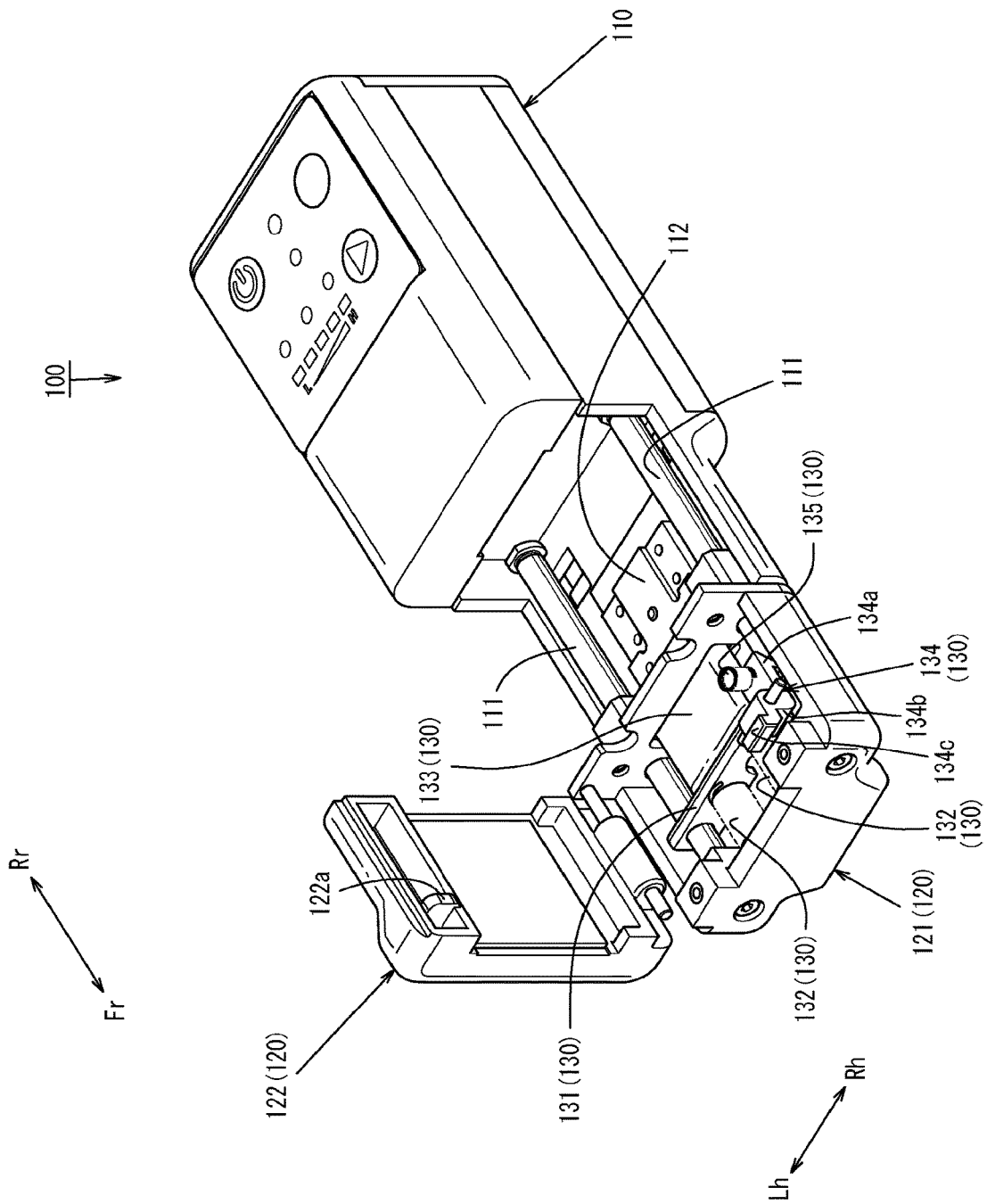
FIG. 16 is an external perspective view of the coating removal device in a state where a part of a housing thereof is detached.

In the above-described embodiment, the coating removal device 10 includes the assisting mechanism 70 provided in the heating portion 40. The present invention is not limited to this. The coating removal device 10 does not need to include the assisting mechanism 70. Alternatively, the coating removal device according to the present invention may be a coating removal device 100 in another embodiment shown in FIG. 15 and FIG. 16. FIG. 15 and FIG. 16 are each an external perspective view of the coating removal device 100. As shown in FIG. 15 and FIG. 16, the coating removal device 100 includes an assisting mechanism 130 provided in a holding portion 120, instead of in a heating portion 110.

FIG. 15 is an external perspective view of the coating removal device 100 in another embodiment. FIG. 16 is an external perspective view of the coating removal device 100 in a state where a part of a housing thereof is detached.

Specifically, as shown in FIG. 15 and FIG. 16, the assisting mechanism 130 of the coating removal device 100 includes a pressing member 131 located in a holding table 121, a pair of first urging springs 132 each providing the pressing member 131 with a rearward urging force, and a pressed member 133 located to the rear of the pressing member 131.

Figure 17A:
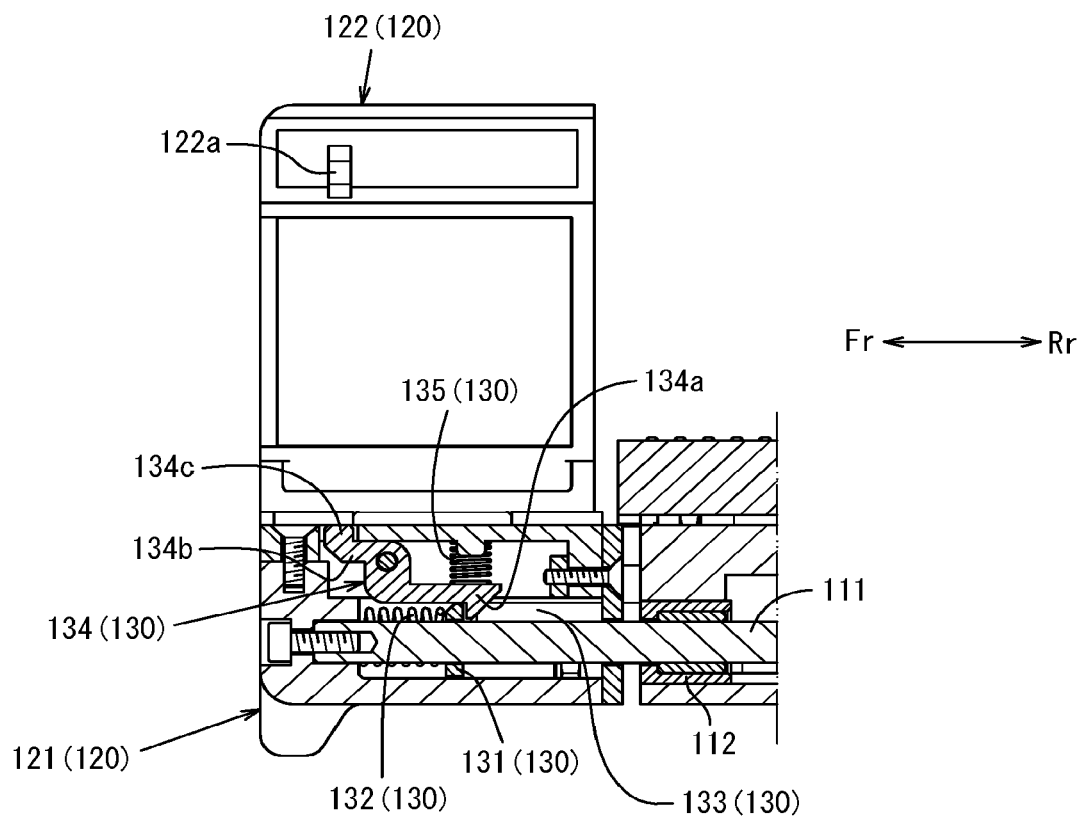
FIGS. 17A and 17B show a movement of a restriction member.
Figure 17B:
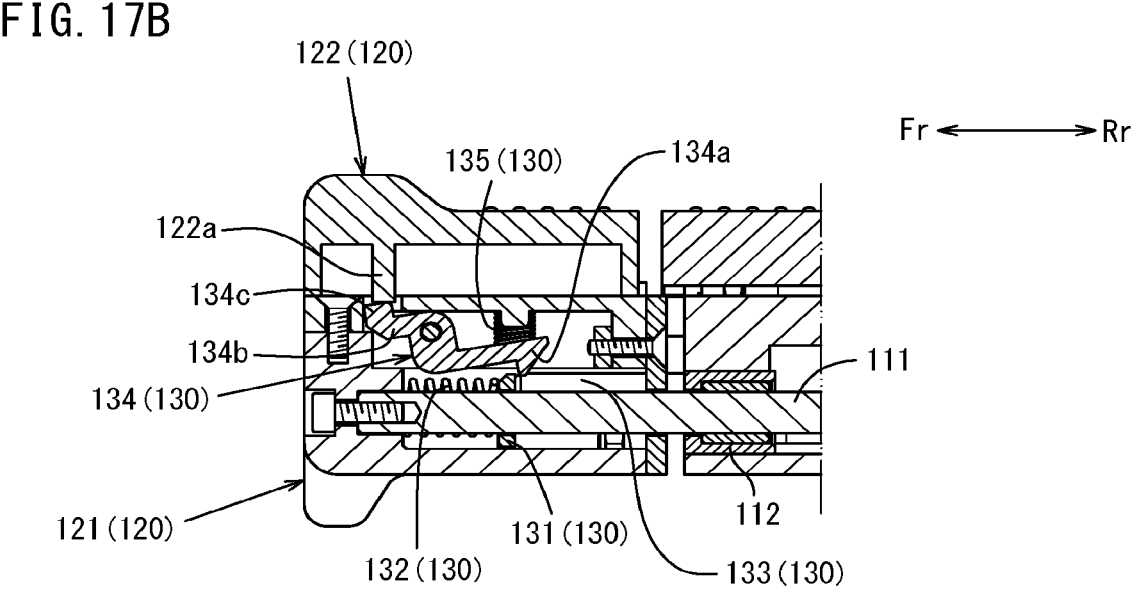

As shown in FIG. 16 and FIGS. 17A and 17B, the assisting mechanism 130 further includes a restriction member 134 including an engaged portion 134*a* at a rear end thereof, and a second urging spring 135 providing the restriction member 134 with a downward urging force. The engaged portion 134*a* is engaged with the pressing member 131.

As shown in FIG. 16, the pressing member 131 is generally flat plate-like and has a thickness in the front-rear direction. The pressing member 131 has openings at both of ends thereof in the width direction. Slide shafts 111 are inserted into the openings.

As shown in FIG. 16, the pressed member 133 is a thick plate-like member that has a rear end secured to a base plate 112 and protrudes into the holding table 121 through an opening provided at a rear surface of the holding table 121.

As shown in FIG. 16 and FIGS. 17A and 17B, the restriction member 134 is supported by a housing of the holding table 121 while being pivotable about a rotation shaft extending in the width direction. As shown in FIG. 16 and FIGS. 17A and 17B, the restriction member 134 includes the engaged portion 134*a* extending rearward from the rotation shaft and engaged with the pressing member 131 from above, and an extending portion 134*b* extending forward from the rotation shaft. The engaged portion 134*a* and the extending portion 134*b* are integrally formed with each other.

At a tip of the extending portion 134*b*, a rectangular protrusion 134*c* protrudes upward. The rectangular protrusion 134*c* is exposed outside via an opening in a top surface of the holding table 121 and pressed by a pressing protrusion 122*a* provided in a heating lid 122.

As shown in FIG. 16 and FIG. 17A, the second urging spring 135 is located so as to provide the engaged portion 134*a* of the restriction member 134 with a downward urging force.

As shown in FIG. 17A, in the coating removal device 100 including the assisting mechanism 130 having such a structure, in a state where the holding lid 122 is opened, the engaged portion 134*a* of the restriction member 134 is engaged with the pressing member 131 by the urging force of the second urging spring 135.

As shown in FIG. 17B, when the holding lid 122 is closed, the pressing protrusion 122*a* in the holding lid 122 presses the rectangular protrusion 134*c* of the restriction member 134 against the urging force of the second urging spring 135. Therefore, as shown in FIG. 17B, the restriction member 134 is pivoted about the rotation shaft such that the engaged portion 134*a* is directed upward.

When the restriction member 134 is pivoted, the engaged portion 134*a* is disengaged from the pressing member 131. Therefore, the first urging springs 132 start pressing the pressed member 133 rearward via the pressing member 131. In other words, since the pressed member 133 is secured to the heating portion 110, the first urging springs 132 provide the holding portion 120 with a forward pressing load.

With such an arrangement, the assisting mechanism 130 assists the operator in an operation of slidably moving the holding portion 120, by the urging force of the first urging springs 132, and thus allows the holding portion 120 to slidably move easily with respect to the heating portion 110. In this manner, the coating removal device 100 may provide substantially the same effect as that of the coating removal device 10 in the above-described embodiment.

The coating removal device 10 is not limited to having the above-described structure, and may include further appropriate element(s). For example, as shown in FIGS. 18A and 18B, the coating removal device 10 may include a stand/fall-type illumination portion 31 provided on a top surface of the device main body 30.

Figure 18A:
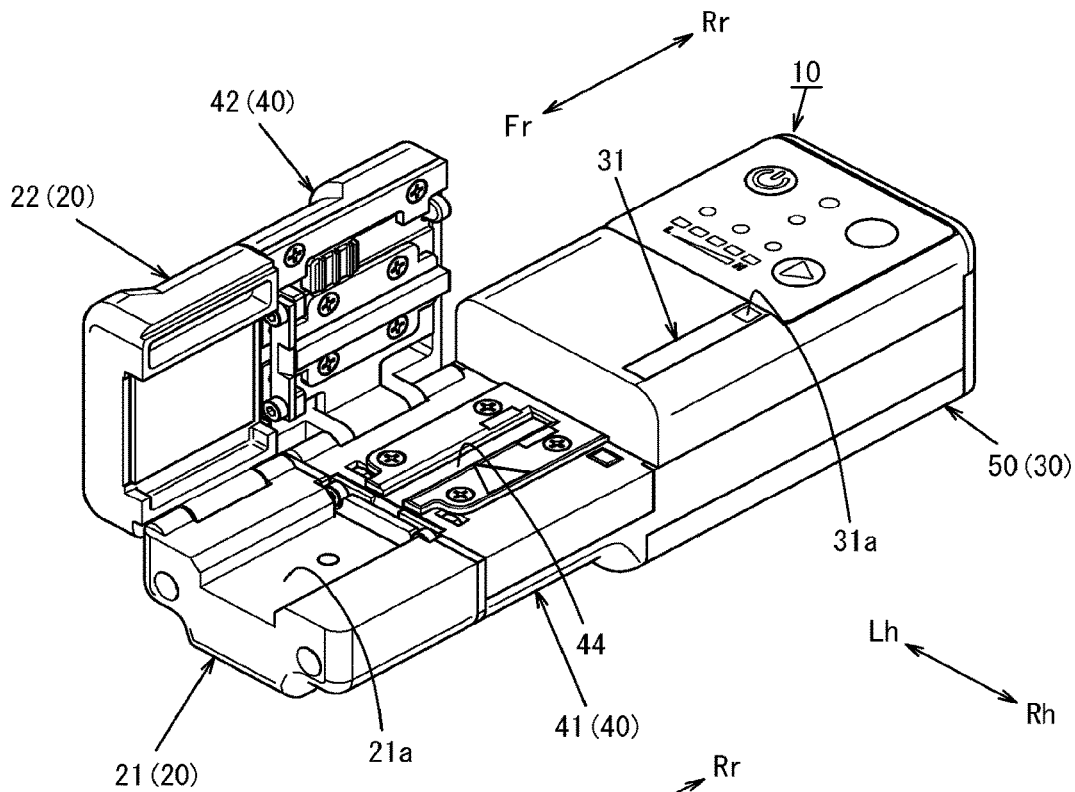
FIGS. 18A and 18B provide external perspective views of the coating removal device including a stand/fall-type illumination portion.
Figure 18B:
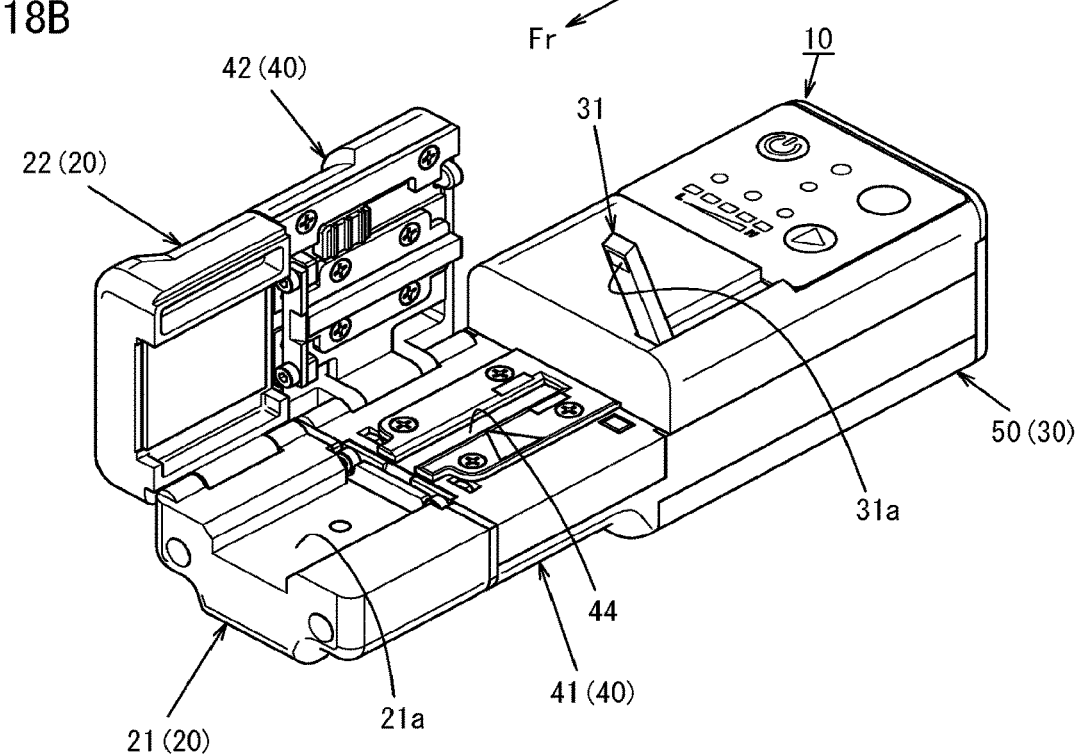

Specifically, as shown in FIGS. 18A and 18B, the stand/fall-type illumination portion 31 is a generally column-shaped member extending in the front-rear direction and may be accommodated in a groove formed in a top surface of the housing of the main body portion 50. The stand/fall-type illumination portion 31 has a front end rotatably supported by the top surface of the housing of the main body portion 50. As shown in FIGS. 18A and 18B, the stand/fall-type illumination portion 31 includes an LED lamp 31*a* at a top surface of a rear end thereof in the accommodated state.

As shown in FIG. 18A, in a state of falling and being accommodated in the top surface of the main body portion 50, the stand/fall-type illumination portion 31 acts as a notifier that gives information to the operator by turning on or blinking the LED lamp 31*a*.

As shown in FIG. 18B, in a state where the stand/fall-type illumination portion 31 is standing such that the LED lamp 31*a* faces the holding table 21, the LED lamp 31*a* acts as an illuminator illuminating the holding table 21 and the heating table 41.

With such a structure, the coating removal device 10 may improve the ease of operation of removing the coating 3. Since the stand/fall-type illumination portion 31 acts as a notifier that gives information to the operator by being turned on or blinked, the coating removal device 10 may give the information to the operator more certainly.

As shown in, for example, FIGS. 19A and 19B and FIGS. 20A and 20B, the coating removal device 10 may include an illumination portion 32 provided at a front surface of the main body portion 50 of the device main body 30 and a reflection portion 33 provided in the heating lid 42. The reflection portion 33 reflects illumination light, provided by the illumination portion 32, upward.

Figure 19A:
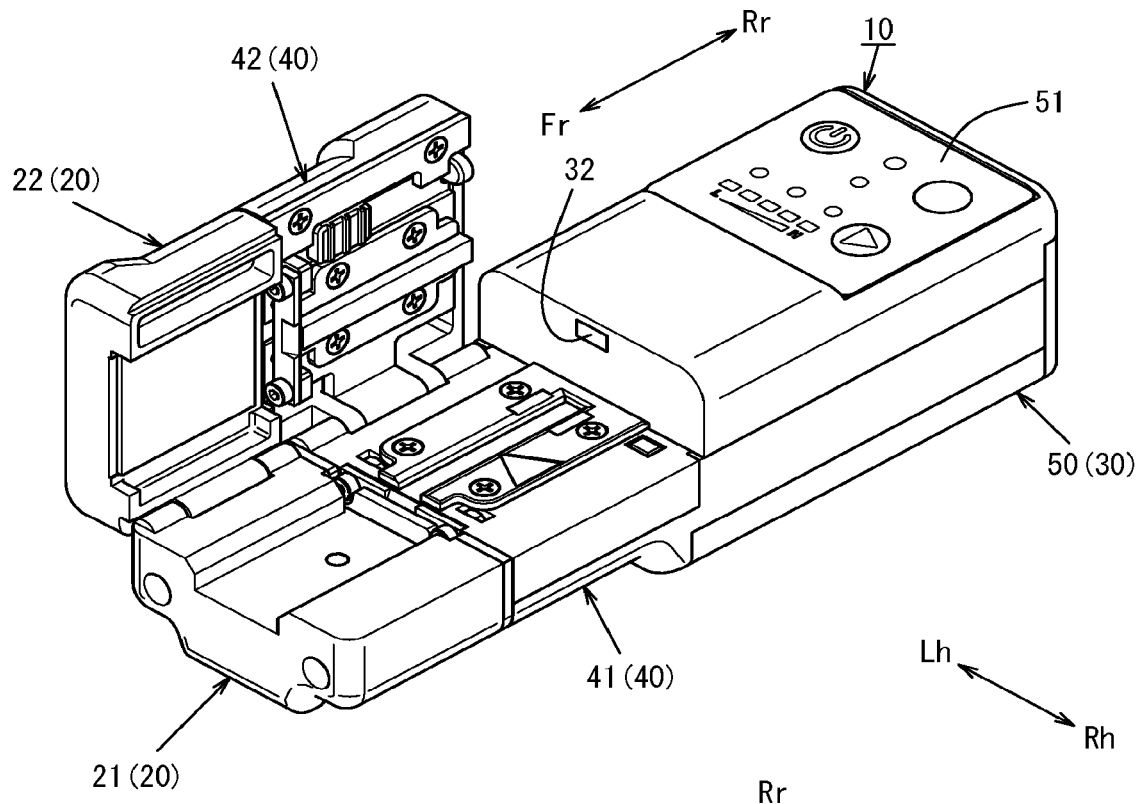
FIGS. 19A and 19B provide external views showing the coating removal device including an illumination portion.
Figure 20A:
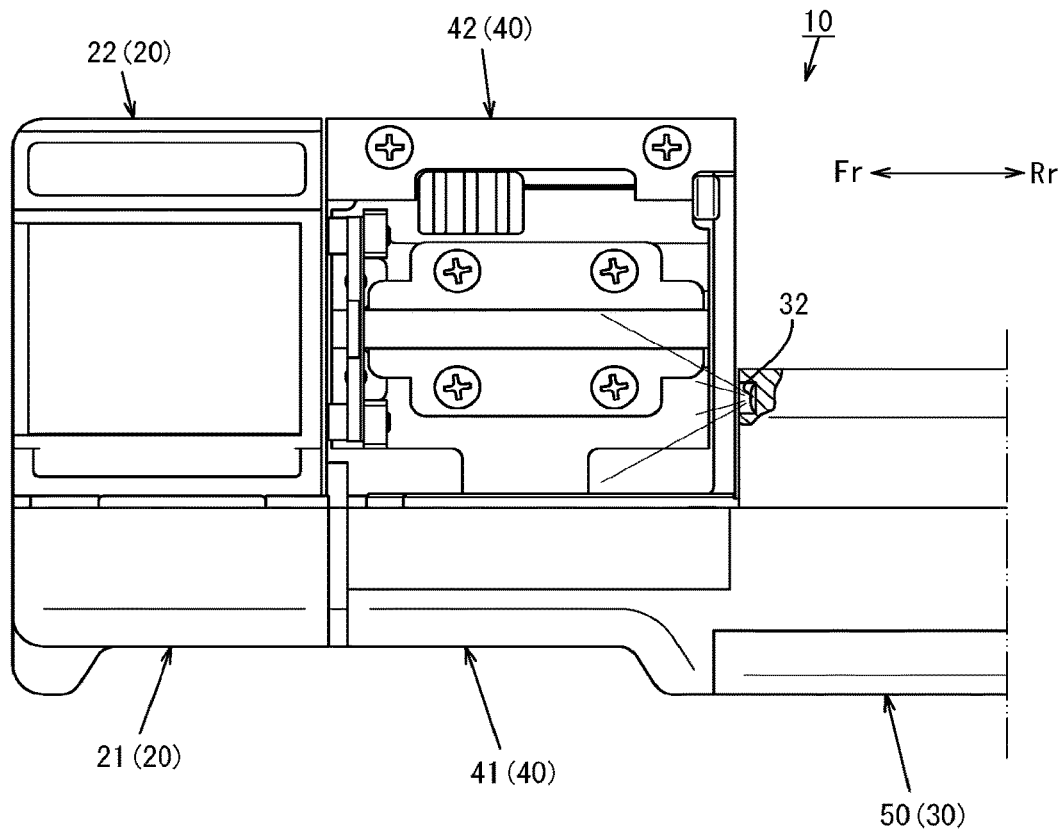
FIGS. 20A and 20B provide views schematically showing the coating removal device including the illumination portion.

Specifically, as shown in FIG. 19A and FIG. 20A, the illumination portion 32 is provided at a central position in the width direction of a top portion of the front surface of the main body portion 50. The illumination portion 32 includes, for example, an LED lamp or the like electrically connected with the controller 59, and is located so as to provide illumination light toward the top surface of the heating table 41 and the bottom surface of the heating lid 42.

Figure 19B:
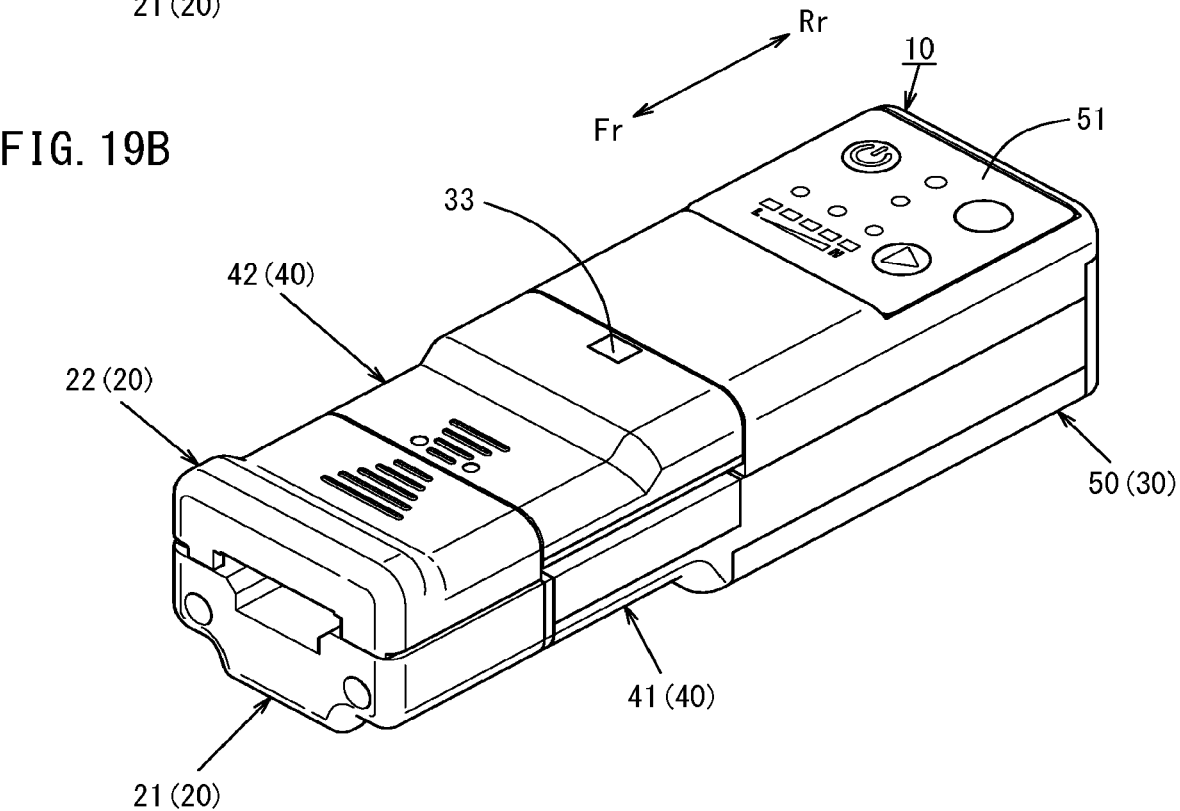
Figure 20B:
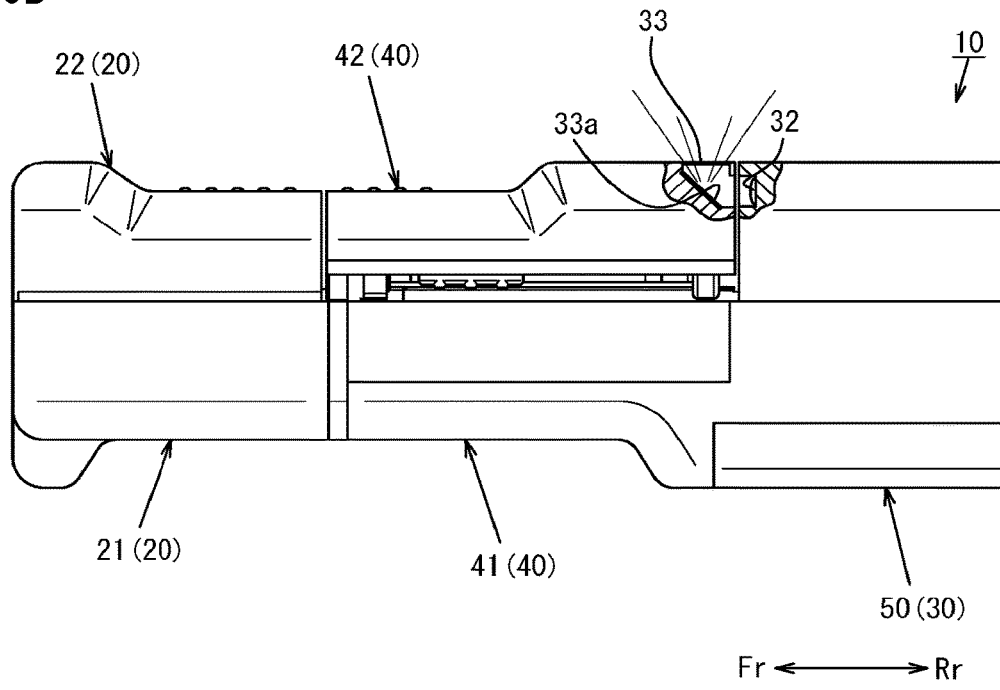

As shown in FIG. 19B and FIG. 20B, the reflection portion 33 is provided to the rear of the heating lid 42 so as to face the illumination portion 32 in the front-rear direction in a state where the heating lid 42 is closed. The reflection portion 33 includes an inner space (no reference sign is provided) formed as a continuous opening in a rear surface of the heating lid 42 facing the illumination portion 32 in the front-rear direction and in a rear portion of a top surface of the heating lid 42, a transparent plate (no reference sign is provided) covering the opening in the rear surface and the top surface of the heating lid 42, and a mirror surface 33a deflecting the illumination light, provided by the illumination portion 32, upward.

As shown in FIG. 20A, the illumination portion 32 of the coating removal device 10 has an operation thereof controlled by the controller 59 so as to be turned on in accordance with whether the heating lid 42 is opened or closed.

For example, in a state where the heating lid 42 is opened, the operation of the illumination portion 32 is controlled by the controller 59 such that the illumination portion 32 acts as an illuminator that illuminates the top surface of the heating table 41 and the bottom surface of the heating lid 42. With such an arrangement, the coating removal device 10 may allow the operator to place the optical fiber 1 easily and to clean the heating table 41 and the heating lid 42 easily.

By contrast, in a state where the heating lid 42 is closed, the operation of the illumination portion 32 is controlled 59 so as to be turned on or blinked when, for example, the heating of the coating 3 is completed. In this case, the reflection portion 33 reflects the illumination light from the illumination portion 32 upward by the mirror surface 33a, and thus causes the illumination light from the illumination portion 32 to be output outside through the transparent plate provided at the top surface of the heating lid 42.

With such an arrangement, the coating removal device 10 may notify the operator that the illumination portion 32 has been turned on or blinked even when the heating lid 42 is closed. Therefore, the coating removal device 10, for example, may allow the illumination portion 32 to act as a notifier that notifies the operator that the heating of the coating 3 is completed by being turned on or blinked.

As described above, the coating removal device 10 may improve the ease of operation of removing the coating 3. In addition, since the illumination portion 32 acts as a notifier that gives information to the operator by being turned on or blinked, the coating removal device 10 may give the information to the operator more certainly.

DESCRIPTION OF THE REFERENCE NUMERALS

1 . . . optical fiber
3 . . . coating
10 . . . coating removal device
20 . . . holding portion
31 . . . stand/fall-type illumination portion
40 . . . heating portion
41a . . . screw hole
43 . . . cutting blade
43a . . . bottom blade
43b . . . top blade
44 . . . heater
45 . . . vibration motor
46 . . . gap adjustment piece
50 . . . main body portion
57 . . . buzzer portion
58 . . . control board
59 . . . controller
60 . . . slide mechanism
61 . . . slide shaft
62 . . . base plate
70 . . . assisting mechanism
74 . . . restriction member
100 . . . coating removal device
110 . . . heating portion
111 . . . slide shaft
112 . . . base plate
120 . . . holding portion
130 . . . assisting mechanism
134 . . . restriction member

What is claimed is:

1. A coating removal device for removing a coating of an optical fiber along an axial direction of the optical fiber, the coating removal device comprising:
a heating portion including a cutting blade making a cut in the coating of the optical fiber, and a heater heating a part of the coating that is closer to a tip thereof than the cutting blade;
a main body portion including a control board electrically connected with the heater;
a holding portion holding the optical fiber, the holding portion being provided on an opposite side opposite to the heater with the cutting blade being located between the holding portion and the heater;
a slide mechanism allowing the holding portion to slidably move with respect to the heating portion such that the holding portion is distanced away from the heating portion in the axial direction; and
an assisting mechanism providing the holding portion with a first urging force acting in the axial direction to assist a sliding movement of the holding portion in a state where the holding portion is holding the optical fiber,
wherein:
the main body portion, the heating portion and the holding portion are located in this order in the axial direction,
the assisting mechanism includes a restriction member using a second urging force acting in a predetermined direction to restrict provision of the first urging force to the holding portion in a state where the holding portion is not holding the optical fiber,
the heating portion includes a vibration notification portion giving information to an operator by vibrating, and
the vibration notification portion vibrates in a direction generally perpendicular to the predetermined direction.

2. The coating removal device according to claim 1, wherein the vibration notification portion is located close to the cutting blade of the heating portion.

3. The coating removal device according to claim 2, wherein:
the heating portion includes a metal base plate secured to a housing of the heating portion, and
the vibration notification portion is secured to the metal base plate.

4. The coating removal device according to claim 3, wherein:
the slide mechanism includes a slide shaft having an end secured to the holding portion, and
the metal base plate slidably supports the slide shaft.

5. The coating removal device according to claim 1, wherein:
the heating portion includes a metal base plate secured to a housing of the heating portion, and
the vibration notification portion is secured to the metal base plate.

6. The coating removal device according to claim 5, wherein:
the slide mechanism includes a slide shaft having an end secured to the holding portion, and
the metal base plate slidably supports the slide shaft.

7. The coating removal device according to claim 1, wherein:
the main body portion includes a control portion controlling an operation of each of the heater and the vibration notification portion, and
the control portion vibrates the vibration notification portion when the heating of the coating is completed.

8. The coating removal device according to claim 1, wherein the heating portion includes a screw hole usable to secure the coating removal device at a predetermined installment position in a work line.

9. The coating removal device according to claim 1, further comprising a buzzer portion giving information to the operator by outputting a sound.

10. The coating removal device according to claim 1, wherein:
the cutting blade includes two blades making a cut while holding the coating therebetween, and
the heating portion includes a gap adjustment portion changing a size of a gap between the two blades by pivoting.

11. The coating removal device according to claim 1, further comprising an illumination portion illuminating the holding portion and the heating portion.

* * * * *